(12) United States Patent
Aoki

(10) Patent No.: US 11,050,901 B2
(45) Date of Patent: Jun. 29, 2021

(54) IMAGE FORMING APPARATUS AND IMAGE FORMING METHOD

(71) Applicant: Toshimasa Aoki, Kanagawa (JP)

(72) Inventor: Toshimasa Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/512,632

(22) Filed: Jul. 16, 2019

(65) Prior Publication Data

US 2020/0045198 A1    Feb. 6, 2020

(30) Foreign Application Priority Data

Jul. 31, 2018 (JP) .............................. JP2018-144473

(51) Int. Cl.
*H04N 1/00* (2006.01)

(52) U.S. Cl.
CPC ..... *H04N 1/00992* (2013.01); *H04N 1/00896* (2013.01); *H04N 1/00933* (2013.01); *H04N 1/00986* (2013.01)

(58) Field of Classification Search
CPC .......... H04N 1/00992; H04N 1/00896; H04N 1/00933; H04N 1/00986; G03G 15/5004; G03G 15/2039; G03G 15/205
See application file for complete search history.

(56) References Cited

U.S. PATENT DOCUMENTS

| | | | |
|---|---|---|---|
| 2005/0111873 A1* | 5/2005 | Regan | G03G 21/206 399/94 |
| 2012/0237248 A1 | 9/2012 | Aoki | |
| 2015/0147079 A1* | 5/2015 | Iwata | G03G 15/5004 399/88 |
| 2017/0171411 A1* | 6/2017 | Anezaki | H04N 1/33384 |

FOREIGN PATENT DOCUMENTS

| | | |
|---|---|---|
| JP | H08-225169 | 9/1996 |
| JP | 2006-242981 | 9/2006 |
| JP | 2015-230459 | 12/2015 |

* cited by examiner

*Primary Examiner* — Iriana Cruz

(74) *Attorney, Agent, or Firm* — IPUSA, PLLC

(57) ABSTRACT

An image forming apparatus includes a heater, first control circuitry, second control circuitry, and a detector. The heater is configured to heat an inside of the apparatus. The first control circuitry is configured to cause the apparatus to be in a standby state, a sleep state having smaller power consumption than the standby state, or a deep sleep state having smaller power consumption than the sleep state. The second control circuitry is configured to control an operation of the heater. The detector is configured to detect humidity of the inside of the apparatus. The first control circuitry causes the apparatus in the deep sleep state to periodically and temporarily return to the sleep state, and the second control circuitry operates the heater according to the humidity detected by the detector in the sleep state to which the apparatus has returned from the deep sleep state.

10 Claims, 21 Drawing Sheets

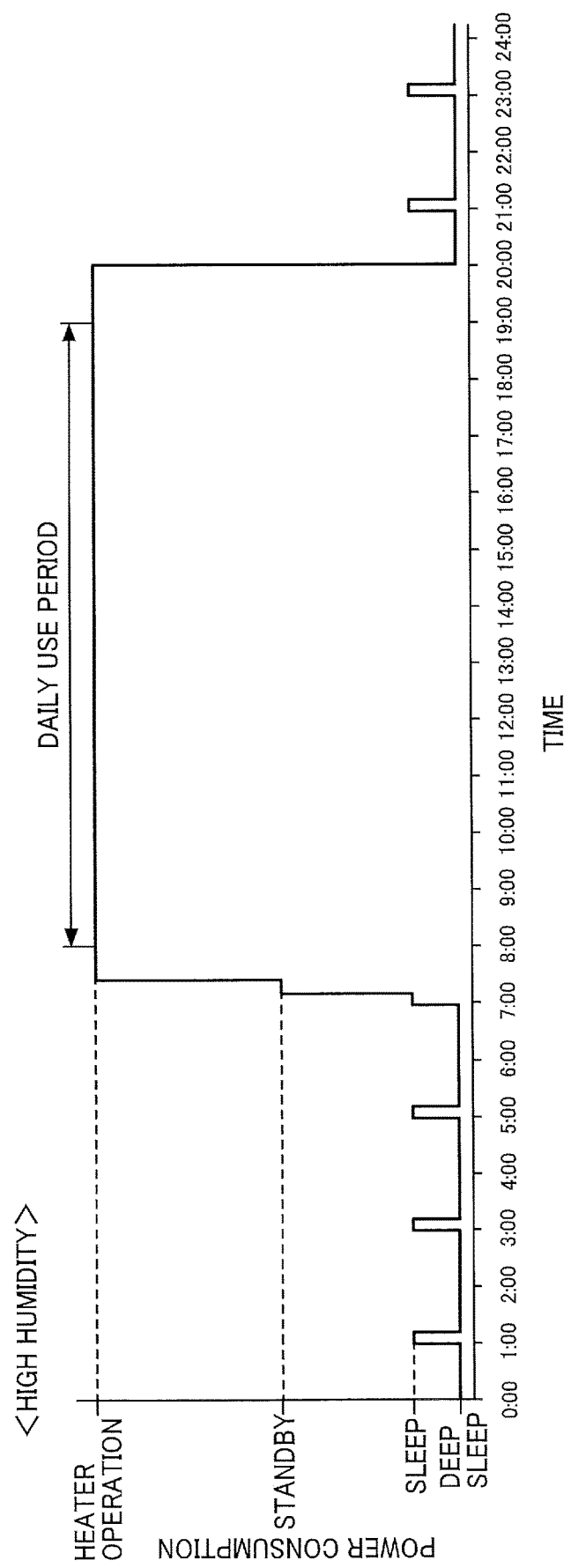

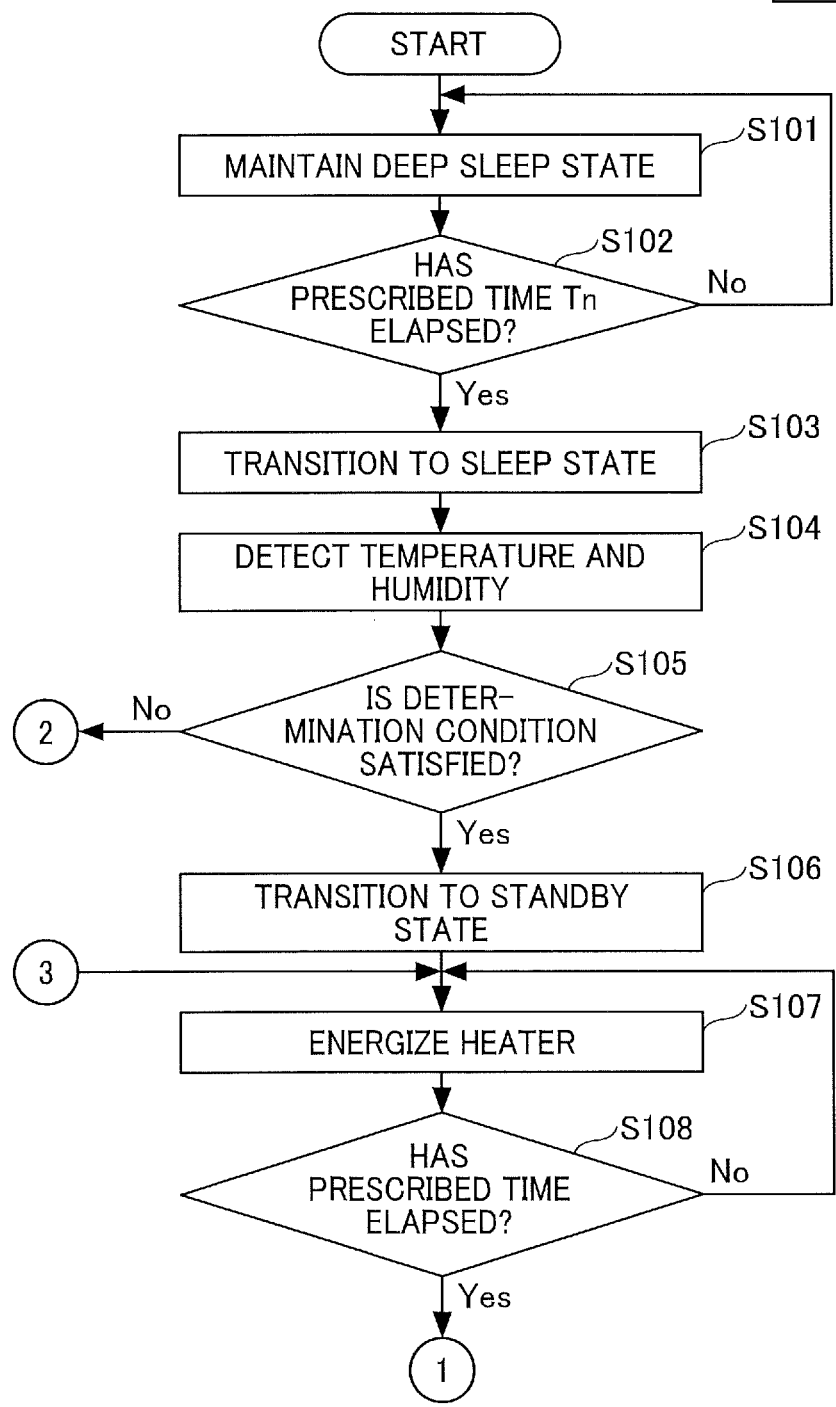

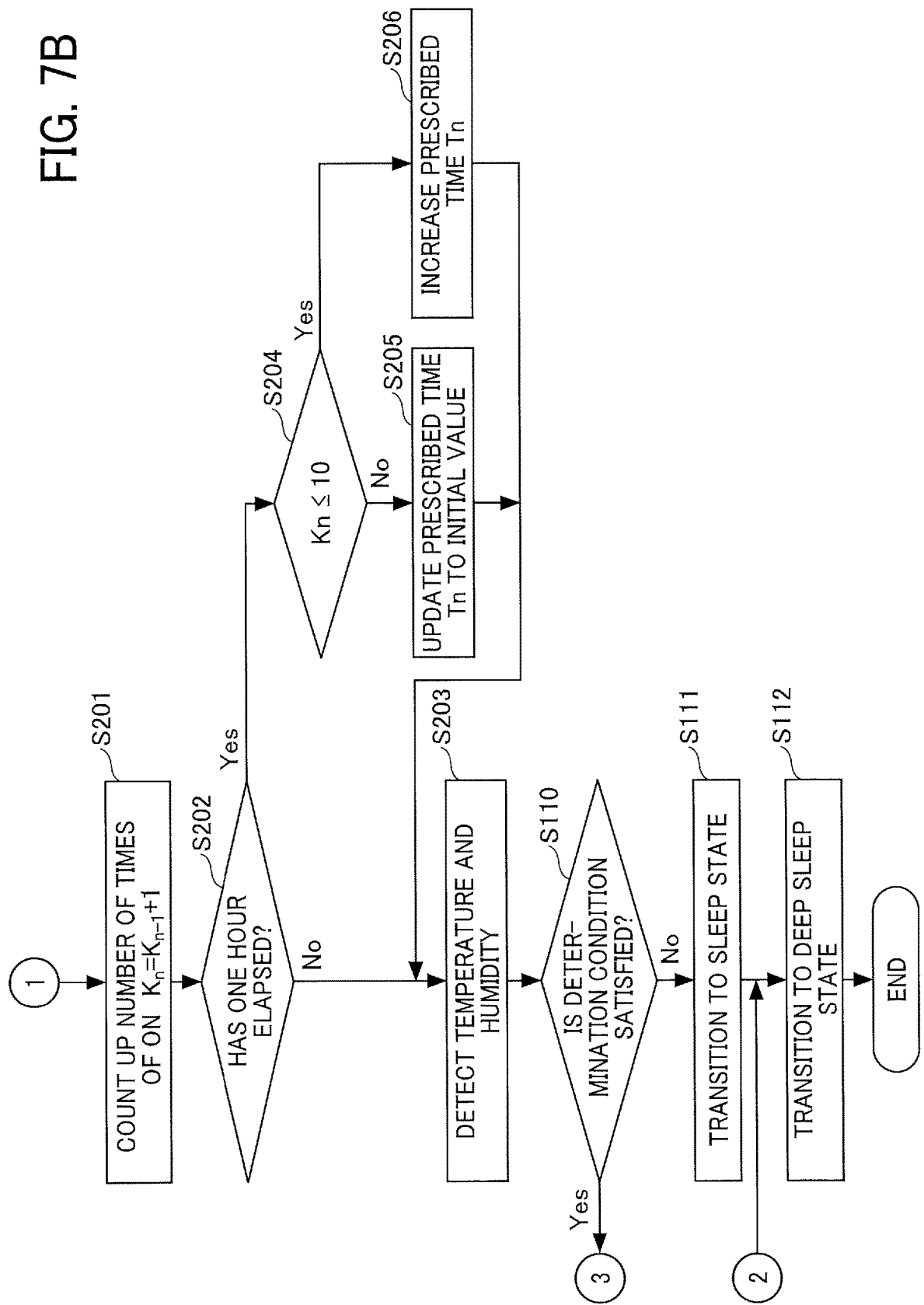

IMAGE FORMING APPARATUS AND IMAGE FORMING METHOD

CROSS-REFERENCE TO RELATED APPLICATION

This patent application is based on and claims priority pursuant to 35 U.S.C. § 119(a) to Japanese Patent Application No. 2018-144473, filed on Jul. 31, 2018, in the Japan Patent Office, the entire disclosure of which is hereby incorporated by reference herein.

BACKGROUND

Technical Field

Aspects of the present invention relate to an image forming apparatus and an image forming method.

Discussion of the Background Art

Conventionally, in image forming apparatuses, a technology for reducing the occurrence of dew condensation that decreases print quality is known.

For example, there is an image forming apparatus that suppresses deterioration of a photoconductor drum due to the occurrence of dew condensation. The image forming apparatus has a normal mode and a power saving mode. In the power saving mode, the image forming apparatus intermittently returns a control device of the photoconductor drum to the normal mode for a predetermined period. The control device of the photoconductor drum rotates the photoconductor drum when a heater for warming the photoconductor drum during the return period is in an on state, thereby reducing the occurrence of dew condensation. Further, in the power saving mode, the heater is turned on according to an output result of a temperature-and-humidity sensor in the image forming apparatus.

Since the image forming apparatus as described above performs on/off control of the heater in the power saving mode, power is supplied to the control device of the image forming apparatus even in the power saving mode. The control device detects the temperature and humidity around the photoconductor drum on the basis of the output of the temperature-and-humidity sensor, and operates the heater according to the detection result. Therefore, the power consumption of the image forming apparatus in the power saving mode may be increased.

SUMMARY

In an aspect of the present invention, there is provided an image forming apparatus that includes a heater, first control circuitry, second control circuitry, and a detector. The heater is configured to heat an inside of the image forming apparatus. The first control circuitry is configured to cause the image forming apparatus to be in a standby state, a sleep state having smaller power consumption than the standby state, or a deep sleep state having smaller power consumption than the sleep state. The second control circuitry is configured to control an operation of the heater. The detector is configured to detect humidity of the inside of the image forming apparatus. The first control circuitry causes the image forming apparatus in the deep sleep state to periodically and temporarily return to the sleep state, and the second control circuitry operates the heater according to the humidity detected by the detector in the sleep state to which the image forming apparatus has returned from the deep sleep state.

In another aspect of the present invention, there is provided an image forming method that includes putting an image forming apparatus into a standby state, a sleep state having smaller power consumption than the standby state, or a deep sleep state having smaller power consumption than the sleep state; causing the image forming apparatus in the deep sleep state to periodically and temporarily return to the sleep state; acquiring information of humidity of an inside of the image forming apparatus in the sleep state to which the image forming apparatus has returned from the deep sleep state; and outputting a command to heat the inside of the image forming apparatus according to the information of humidity.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5B is a diagram illustrating an example of an operation of the image forming apparatus according to the first embodiment at the time of high humidity;

FIG. 7 (including FIGS. 7A and 7B) is a flowchart illustrating an example of an operation of the image forming apparatus according to the second embodiment;

Figure 1:
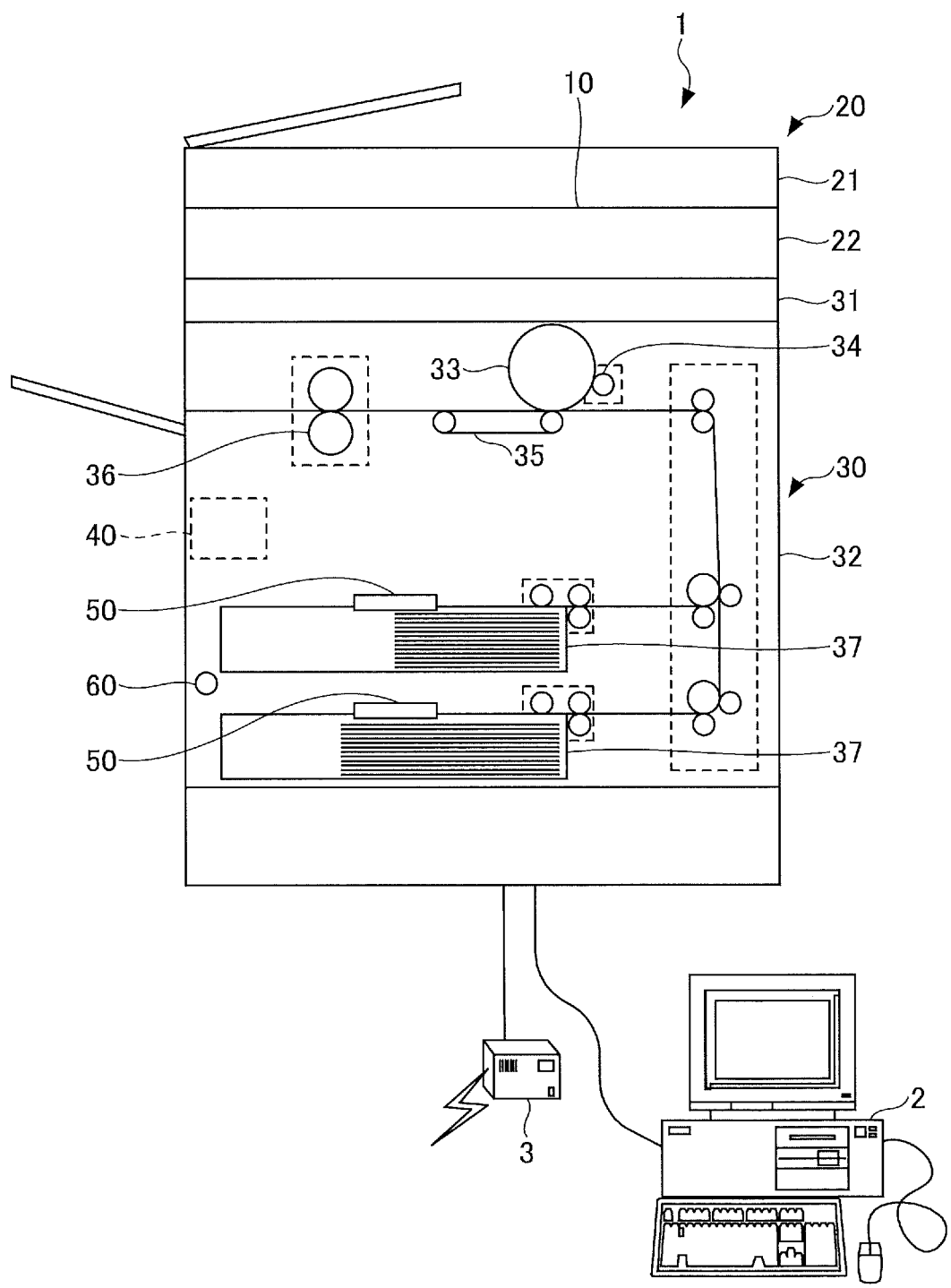
FIG. 1 is a side view illustrating an example of a configuration of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention will be described with reference to the attached drawings. In the present specification and drawings, constituent elements having substantially the same functional configurations are denoted by the same reference numerals to omit redundant description.

First Embodiment

Configuration of Image Forming Apparatus

A configuration of an image forming apparatus 1 according to the first embodiment will be described. FIG. 1 is a side view illustrating an example of a configuration of an image forming apparatus 1 according to a first embodiment. In FIG. 1, the image forming apparatus 1 is drawn through the inside. In the present embodiment, the image forming apparatus 1 is an electrophotographic image forming apparatus and will be described as a multifunctional copying machine that forms an image on a recording medium. That is, the multifunctional copying machine is an example of the image forming apparatus. The image forming apparatus may be any apparatus that forms an image on a recording medium, and may be, for example, a simple copying machine or printing machine. The recording medium may be any recording medium as long as an image can be formed on a surface of the recording medium. Examples of the recording medium include, but are not limited to, sheet materials such as paper, cloth, film, and plate.

The image forming apparatus 1 according to the present embodiment can form, on the recording medium, an image of information read from a recording medium such as paper. Furthermore, the image forming apparatus 1 can form, on the recording medium, an image of information acquired from a computer device 2 such as a personal computer (PC), and an image of information acquired through a telephone line via a private branch exchanger (PBX) 3 or the like. That is, the image forming apparatus 1 has a copying function, a printer function, and a facsimile function. The image forming apparatus 1 switches the functions and operates in a mode of the switched function in response to an input of a user on an operation board 10 described below.

The image forming apparatus 1 includes the operation board 10, an image reader 20, a printer 30, a control device 40, and a heater 50. The operation board 10 is an interface that receives a command related to the operation of the image forming apparatus 1 from the user, and includes, for example, a display, a touch panel, and buttons. The image reader 20 reads information on the recording medium and outputs the read information as image data to the printer 30. The printer 30 forms a toner image on the basis of the image data, and prints the toner image on the recording medium stored in the image forming apparatus 1. In the present embodiment, the recording medium is paper. The image data acquired by the printer 30 is the image data acquired by the image reader 20, the image data acquired from the computer device 2, or the image data acquired through the PBX 3.

The image reader 20 includes an auto document feeder (ADF) 21 and an image reading device 22. The ADF 21 sequentially sends a paper document disposed on the ADF 21 to the image reading device 22. The image reading device 22 acquires image data from a surface of each paper document sent from the ADF 21 and outputs the image data to the printer 30 or the control device 40. The printer 30 prints the image data on paper, and the control device 40 sends the image data to an external destination via the PBX 3 or sends the image data to the computer device 2

The printer 30 includes a writing unit 31, a printer unit 32, a photoconductor 33, a developing device 34, a conveyance belt 35, a fixing device 36, and a paper feeding unit 37.

The writing unit 31 performs exposure corresponding to the image data acquired from the image reading device 22 or the like. The photoconductor 33 is uniformly charged by a charger and then receives the exposure corresponding to the image data to form an electrostatic latent image on a surface of the photoconductor 33. For example, the photoconductor 33 may be a drum-shaped member or may have a configuration to transfer the electrostatic latent image via an endless intermediate transfer belt. The developing device 34 develops the electrostatic latent image on the photoconductor 33 to form a toner image, which is a developed image by toner, on the surface of the photoconductor 33. The conveyance belt 35 transfers the toner image to a transfer sheet that is a paper sent from the paper feeding unit 37. The fixing device 36 includes a heater for fixing, and heats the transfer sheet to fix the toner image on the transfer sheet. The transfer sheet after passing through the fixing device 36 is discharged to the outside of the image forming apparatus 1.

The heater 50 heats air inside the image forming apparatus 1 to adjust humidity in the image forming apparatus 1. In the present embodiment, the heater 50 is disposed in a vicinity of the paper feeding unit 37 and adjusts the humidity of the transfer sheet in the paper feeding unit 37. The heater 50 may generate heat by receiving an electrical action and may include, for example, heating wire or the like.

The image forming apparatus 1 further includes a temperature-and-humidity sensor 60 in the vicinity of the paper feeding unit 37 inside the image forming apparatus 1. The temperature-and-humidity sensor 60 detects temperature and humidity around the temperature-and-humidity sensor 60. The temperature-and-humidity sensor 60 may include a temperature sensor and a humidity sensor. Examples of the temperature sensor include, but are not limited to, a thermocouple, a temperature resistor such as a thermistor, an infrared radiator, a bimetal temperature sensor, a fluid expansion temperature sensor, and a state change temperature sensor. Examples of the humidity sensor include, but are not limited to, a bimetallic humidity sensor, a capacitive electronic sensor, and a resistive electronic sensor.

The control device 40 controls the overall operation of the image forming apparatus 1. For example, the control device 40 includes a computer such as a microcomputer. The control device 40 controls operations of the image reader 20, the printer 30, the heater 50, and the temperature-and-humidity sensor 60. The control device 40 controls the operation of the image forming apparatus 1 in each of the printer function, the copying function, and the facsimile function on the basis of a command input to the operation board 10. Furthermore, the control device 40 controls the activation and stop of the heater 50 on the basis of the temperature and humidity detected by the temperature-and-humidity sensor 60.

Figure 2:
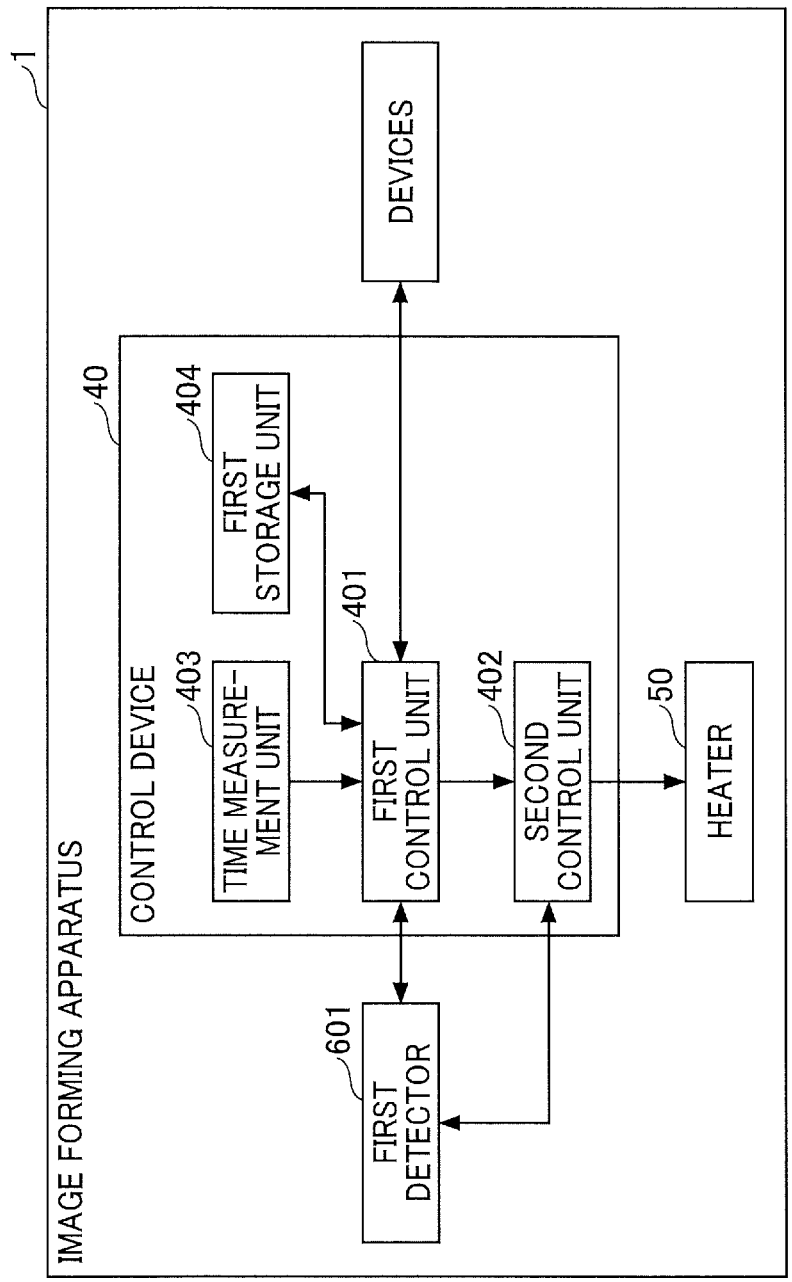
FIG. 2 is a block diagram illustrating an example of a functional configuration of a control device of the image forming apparatus according to the first embodiment.
Figure 3:
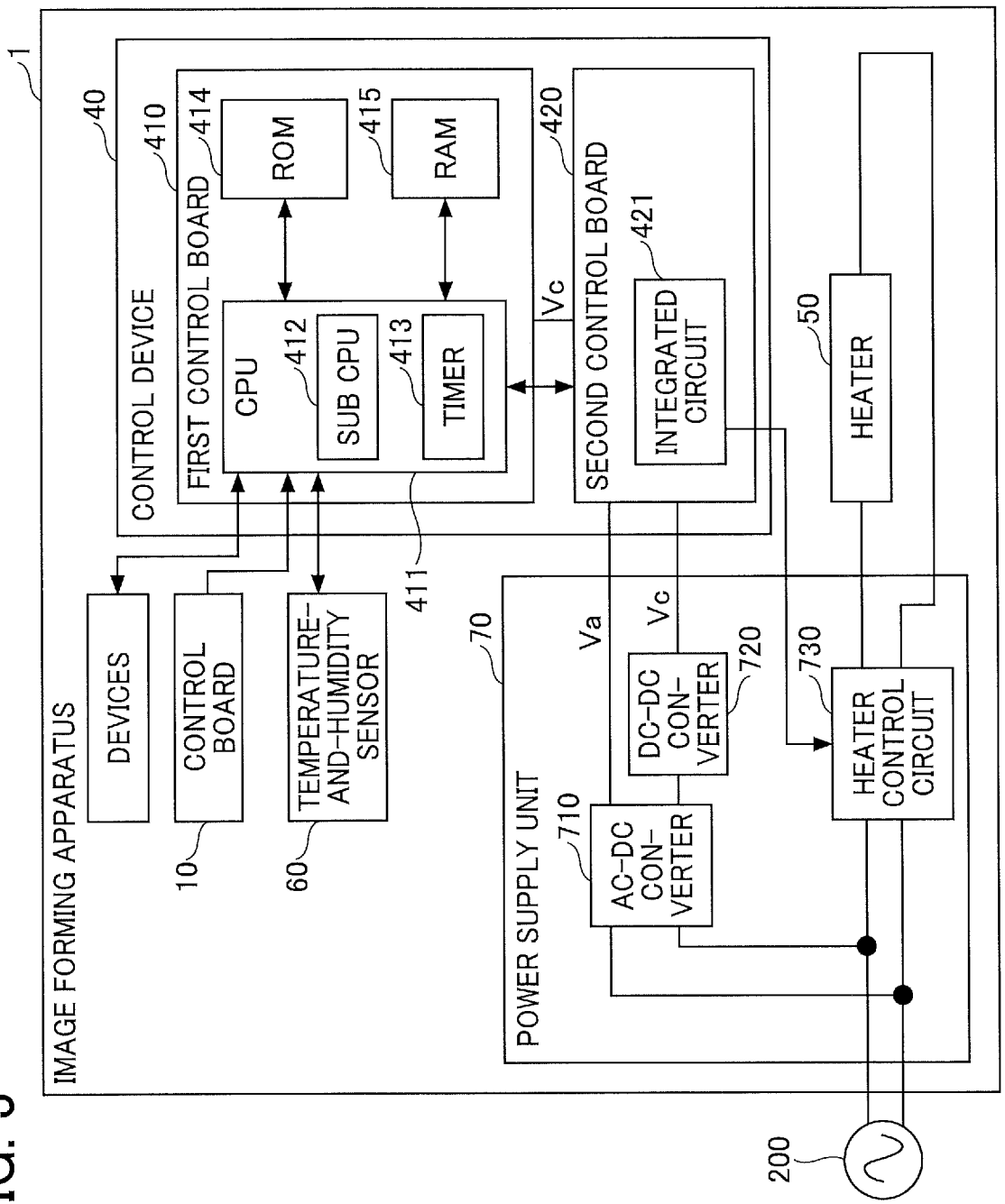
FIG. 3 is a block diagram illustrating an example of a hardware configuration of the control device of the image forming apparatus according to the first embodiment.

Next, a configuration of the control device 40 will be described. FIG. 2 is a block diagram illustrating an example of a functional configuration of the control device 40 of the image forming apparatus 1 according to the first embodiment. FIG. 3 is a block diagram illustrating an example of a hardware configuration of the control device 40 of the image forming apparatus 1 according to the first embodiment.

First, a functional configuration of the control device 40 will be described. As illustrated in FIG. 2, the control device 40 includes a first control unit 401, a second control unit 402, a time measurement unit 403, and a first storage unit 404 as functional constituent elements. Further, the control device 40 is connected to a first detector 601, the heater 50, and devices of the image forming apparatus 1. The first detector 601 detects the humidity of the inside of the image forming apparatus 1, and an example of the first detector 601 is the temperature-and-humidity sensor 60.

The first control unit 401 controls the operations of the devices of the image forming apparatus 1. For example, the first control unit 401 causes the image forming apparatus 1 to be a standby state, a sleep state having smaller power consumption than the standby state, or a deep sleep state having smaller power consumption than the sleep state. The standby state, the sleep state, and the deep sleep state are states in which the image forming apparatus 1 does not operate for image formation in the copying function, the printer function, or the facsimile function, that is, the functions for image formation are restricted. Furthermore, the first control unit 401 controls the operation of the first detector 601. The first control unit 401 operates the first detector 601 and acquires humidity information including at least the humidity, of the humidity and the temperature of the inside of the image forming apparatus 1.

In addition, the first control unit 401 acquires information of time detected by the time measurement unit 403. The time measurement unit 403 measures an elapsed time or a time and outputs the measured elapsed time or time to the first control unit 401. An example of the information of time includes the elapsed time and the time.

For example, when the elapsed time of the deep sleep state of the image forming apparatus 1 reaches a first predetermined time, the first control unit 401 puts the image forming apparatus 1 into the sleep state. After that, the first control unit 401 operates the first detector 601 to acquire the humidity information. In a case where the humidity of the humidity information is equal to or higher than a first humidity threshold value, the first control unit 401 puts the image forming apparatus 1 into the standby state to operate the heater 50. Meanwhile, in a case where the humidity is less than the first humidity threshold value, the first control unit 401 maintains the image forming apparatus 1 in the sleep state. Furthermore, when the elapsed time of the sleep state reaches a second predetermined time while the humidity is kept to be less than the first humidity threshold value, the first control unit 401 puts the image forming apparatus 1 into the deep sleep state. In the present embodiment, the first predetermined time is longer than the second predetermined time. An example of the first predetermined time is two hours, and an example of the second predetermined time is ten minutes. However, the first and second predetermined times are not limited to the examples.

Each threshold value and each predetermined time are stored in the first storage unit 404 in association with each other The first control unit 401 controls the state of the image forming apparatus 1 on the basis of the information of time acquired from the time measurement unit 403 and information of the threshold values and the predetermined times stored in the first storage unit 404. That is, the first control unit 401 periodically and temporarily returns the image forming apparatus 1 in the deep sleep state into the sleep state. Hereinafter, this return is also referred to as "periodic return". The above-described periodic return is return performed at predetermined intervals, and the predetermined interval between returns, in other words, a cycle may be the same as or different from other predetermined intervals or cycles.

The second control unit 402 controls the operation of the heater 50. The second control unit 402 operates the heater 50 according to the humidity detected by the first detector 601 when the image forming apparatus 1 is in the sleep state having returned from the deep sleep state. Specifically, in the sleep state, the second control unit 402 operates the first detector 601 to acquire the humidity information of the inside of the image forming apparatus 1. Note that the first control unit 401 may operate the first detector 601. Furthermore, the second control unit 402 acquires the information of time detected by the time measurement unit 403. In the present embodiment, the second control unit 402 acquires the information of time via the first control unit 401. However, the second control unit 402 may directly acquire the information of time from the time measurement unit 403.

In a case where the humidity is equal to or higher than the first humidity threshold value, and the image forming apparatus 1 is in the standby state, the second control unit 402 activates the heater 50. When an operation time that is an elapsed time from an activation start time of the heater 50 reaches a third predetermined time, the second control unit 402 operates the first detector 601 to acquire the humidity information. Furthermore, the second control unit 402 stops the heater 50 when the humidity of the humidity information is less than a second humidity threshold value, and continues the operation of the heater 50 when the humidity is equal to or higher than the second humidity threshold value. In the present embodiment, the second humidity threshold value is the same as the first humidity threshold value. That is, a condition for turning off the heater 50 and a condition for turning on the heater 50 are in an inextricable relationship. However, the first humidity threshold value and the second humidity threshold value may be different, and for example, the second humidity threshold value may be smaller than the first humidity threshold value. In this case, a time to when the humidity rises to the first humidity threshold value or higher again after the stop of the heater 50 at the humidity less than the second humidity threshold value can be made long. Therefore, frequent ON and OFF of the heater 50 can be reduced.

Each threshold value and each predetermined time are stored in the first storage unit 404 in association with each other. In the present embodiment, the second control unit 402 acquires the information stored in the first storage unit 404 via the first control unit 401. However, the second control unit 402 may directly acquire the information from the first storage unit 404. The second control unit 402 controls the operation of the heater 50 on the basis of the information of time acquired from the time measurement unit 403 and the information of the threshold values and the predetermined times stored in the first storage unit 404.

Next, a hardware configuration of the control device 40 will be described. As illustrated in FIG. 3, the control device 40 includes a first control board 410 and a second control board 420 as hardware constituent elements. The first control board 410 is a circuit board that controls the operations of the devices of the image forming apparatus 1, and the second control board 420 is a circuit board that controls power supply to the heater 50. Further, the control device 40 is connected to a power supply 200 via a power supply unit 70 of the image forming apparatus 1. The control device 40 receives power supply from the power supply 200 via the power supply unit 70. In the present embodiment, the power supply 200 is, but not limited to, a commercial AC power supply.

The first control board 410 includes a central processing unit (CPU) 411 that is a processor or the like, a read only memory (ROM) 414 that is a non-volatile semiconductor storage device or the like, and a random access memory (RAM) 415 that is a volatile semiconductor storage device or the like. For example, the CPU 411 executes processing by executing a program stored in the ROM 414 using the RAM 415 as a working memory. Note that the control device 40 may include another storage device such as a hard disk.

The CPU 411 is connected to the devices of the image forming apparatus 1 and outputs a signal of a control command that is a command for controlling the devices to the devices. The CPU 411 is connected to the operation board 10 and acquires a command of a user input to the operation board 10. The CPU 411 outputs a signal of control command according to the command of the user to the devices. The CPU 411 is connected to the temperature-and-humidity sensor 60, outputs a command to execute measurement to the temperature-and-humidity sensor 60, and acquires a measurement result of the temperature and humidity from the temperature-and-humidity sensor 60. In the present embodiment, the measurement result is, but not limited to, time series data including a plurality of measurement values of the temperatures and humidity measured with the passage of time, and measurement times of the respective measurement values in association with one another.

Further, the CPU 411 includes a sub CPU 412 and a timer 413. The sub CPU 412 is a processor having restricted processing targets and restricted processing capacity, as compared with the CPU 411. The sub CPU 412 is operated with much smaller power than the CPU 411. The timer 413 measures the elapsed time or time under the control of the CPU 411 or the sub CPU 412.

The second control board 420 is connected to the power supply unit 70. Further, the second control board 420 includes an integrated circuit 421. The integrated circuit 421 outputs a control signal for operating the heater 50 to a heater control circuit 730 of the power supply unit 70 according to the command acquired from the CPU 411. The heater control circuit 730 receives power supply from the power supply 200 and supplies drive power corresponding to the control signal to the heater 50. Further, the second control board 420 receives power supply from the power supply 200 via an alternating current-direct current (AC-DC) converter 710 and a direct current-direct current (DC-DC) converter 720 included in the power supply unit 70, and supplies power for driving to the first control board 410.

The first control unit 401 is implemented by the CPU 411 and the like, and the second control unit 402 is implemented by the CPU 411, the integrated circuit 421, and the like. The first storage unit 404 is implemented by the ROM 414, the RAM 415, and the like, and for example, the threshold values and the predetermined times, and the relationship between the threshold values and the predetermined times can be stored in the ROM 414. The time measurement unit 403 is implemented by the timer 413 and the like.

Note that the constituent elements of the first control unit 401 and the second control unit 402 may be implemented by a program execution unit such as the CPU 411, may be implemented by a circuit, or may be implemented by a combination of the program execution unit and the circuit. For example, these constituent elements may be implemented as a large scale integration (LSI) as an integrated circuit. These constituent elements may be individually made into one chip or may be made into one chip so as to include part or all of the constituent elements. As the LSI, a field programmable gate array (FPGA) that can be programmed after LSI manufacturing, a reconfigurable processor that can reconfigure at least one of connection and setting of circuit cells inside the LSI, an application specific integrated circuit (ASIC) in which circuits of a plurality of functions are combined into one for a specific application, or the like may be used. The first storage unit 404 may be implemented as a storage device such as a hard disk or a solid state drive (SSD).

Further, when the image forming apparatus 1 is in the deep sleep state, the sub CPU 412 and the timer 413 are in an energized state but the other constituent elements of the first control board 410 such as the CPU 411 and the second control board 420 are in a non-energized state, in the control device 40. At this time, the sub CPU 412 operates the timer 413 and determines whether the elapsed time of the deep sleep state has reached the first predetermined time. As described above, in the deep sleep state, almost all the functions of the image forming apparatus 1 except the sub CPU 412 and the timer 413 are stopped. For this reason, the heater 50 and the temperature-and-humidity sensor 60 are not energized.

In the sleep state, the entire first control board 410 is in the energized state, but the second control board 420 is in the non-energized state. At this time, the CPU 411 operates the temperature-and-humidity sensor 60 to acquire the humidity information in the image forming apparatus 1. As described above, in the sleep state, almost all the functions of the image forming apparatus 1 except the first control board 410 and the temperature-and-humidity sensor 60 are stopped. Therefore, the heater 50 is not energized.

In the standby state, the entire first control board 410 and second control board 420 are in the energized state. Almost all the functions of the image forming apparatus 1 can be activated immediately. The heater 50 can be operated in the standby state. Regarding an activation time required for the activation of each function of the image forming apparatus 1, the activation time in the sleep state is longer than the activation time in the standby state, and the activation time in the deep sleep state is longer than the activation time in the sleep state.

Operation of Image Forming Apparatus

Figure 4:
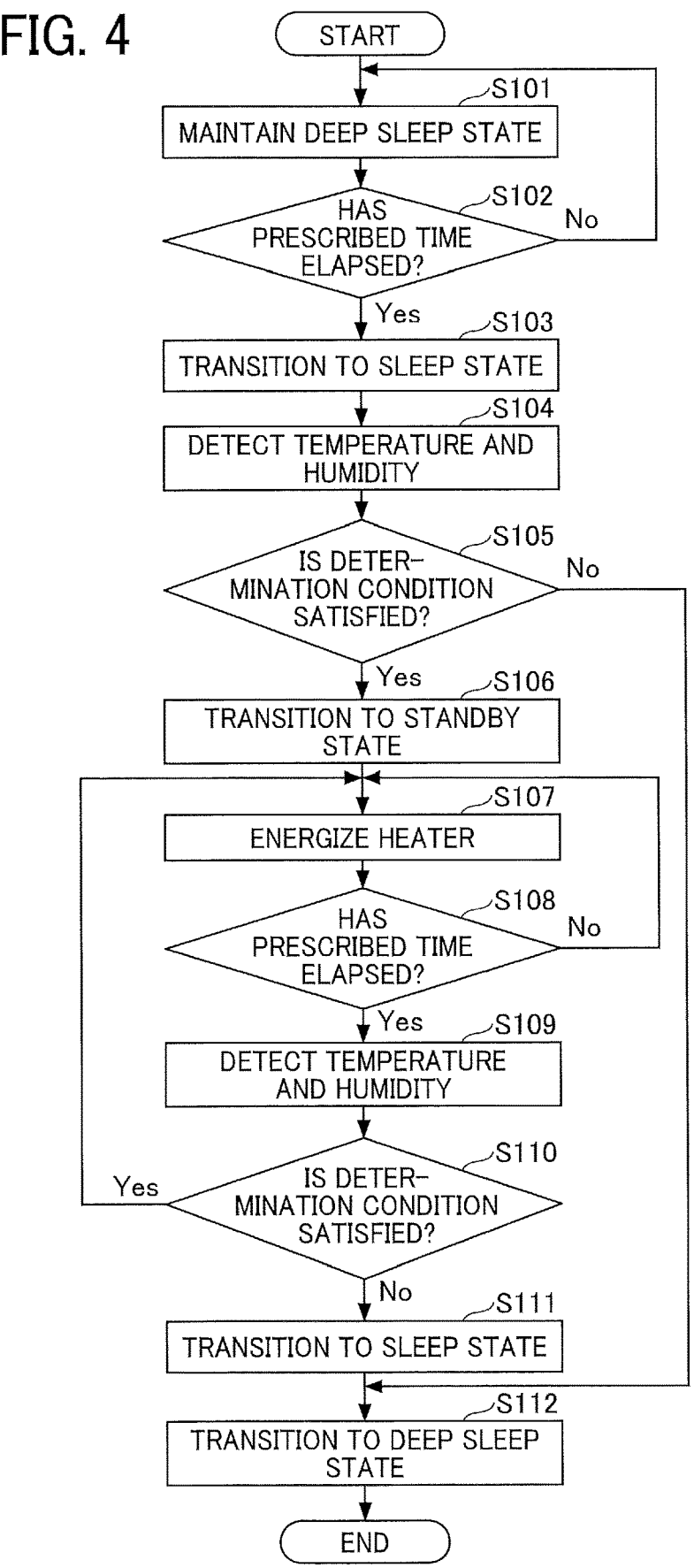
FIG. 4 is a flowchart illustrating an example of an operation of the image forming apparatus according to the first embodiment.

The operation of the image forming apparatus 1 according to the first embodiment will be described. Hereinafter, the operation of the image forming apparatus 1 in the deep sleep state will be described. FIG. 4 is a flowchart illustrating an example of the operation of the image forming apparatus 1 according to the first embodiment. As illustrated in FIG. 4, first, the first control unit 401 of the control device 40 maintains the deep sleep state for the image forming apparatus 1 (step S101).

Next, the first control unit 401 determines whether the first predetermined time, which is a prescribed time, has elapsed since the image forming apparatus 1 was in the deep sleep state (step S102). The first control unit 401 proceeds to step S103 in a case where the first predetermined time has elapsed (Yes in step S102), and returns to step S101 in a case where the first predetermined time has not elapsed (No in step S102).

Figure 5A:
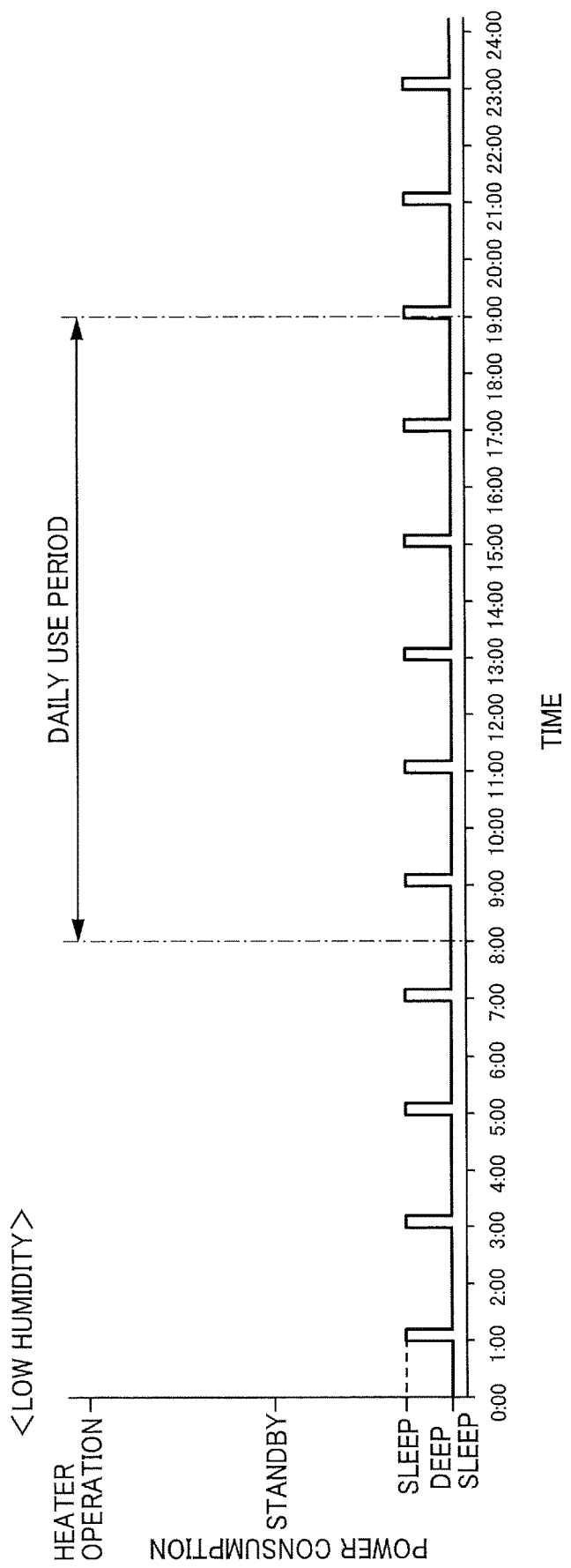
FIG. 5A is a diagram illustrating an example of an operation of the image forming apparatus according to the first embodiment at the time of low humidity.

In step S103, the first control unit 401 causes the image forming apparatus 1 to transition from the deep sleep state to the sleep state. In this manner, the first control unit 401 causes the image forming apparatus 1 in the deep sleep state to return to the sleep state each time the elapsed time in the deep sleep state reaches the first predetermined time. For example, the periodic return from the deep sleep state to the sleep state is performed as illustrated in FIGS. 5A and 5B. Note that FIG. 5A is a diagram illustrating an example of the operation of the image forming apparatus 1 according to the first embodiment at the time of low humidity. FIG. 5B is a diagram illustrating an example of the operation of the image forming apparatus 1 according to the first embodiment at the time of high humidity. In FIGS. 5A and 5B, the horizontal axis represents the elapsed time, and the vertical axis represents the power consumption of the image forming apparatus 1.

Next, the first control unit 401 causes the temperature-and-humidity sensor 60 to detect the temperature and humidity, and acquires the detection result (step S104). Furthermore, the first control unit 401 determines whether the humidity satisfies a determination condition (step S105). The determination condition is that the humidity is equal to or higher than the first humidity threshold value. The first control unit 401 proceeds to step S106 in a case where the humidity satisfies the determination condition, that is, the humidity is equal to or higher than the first humidity threshold value (Yes in step S105), and proceeds to step S112 in a case where the humidity does not satisfy the determination condition, that is, the humidity is less than the first humidity threshold value (No in step S105).

For example, the case where the humidity does not satisfy the determination condition corresponds to FIG. 5A and the case where the humidity satisfies the determined condition corresponds to FIG. 5B. The case where the humidity does not satisfy the determination condition corresponds the case of low humidity. In this case, as illustrated in FIG. 5A, after temporarily maintaining the sleep state for the second predetermined time, the first control unit 401 causes the image forming apparatus 1 to transition to the deep sleep state, as will be described in step S112 below.

In step S106, the first control unit 401 causes the image forming apparatus 1 to transition from the sleep state to the standby state. Furthermore, in step S107, the second control unit 402 of the control device 40 outputs the command for activating the heater 50 to energize and activate the heater 50. The case in Yes in step S105 corresponds to the case of high humidity. In this case, as illustrated in FIG. 5B, after the first control unit 401 causes the image forming apparatus 1 to transition to the standby state, the second control unit 402 activates the heater 50.

Next, the second control unit 402 determines whether the third predetermined time, which is a prescribed time, has elapsed since the time of energization of the heater 50 (step S108). The second control unit 402 proceeds to step S109 in a case where the third predetermined time has elapsed (Yes in step S108), and returns to step S107 in a case where the third predetermined time has not elapsed (No in step S108).

In step S109, the second control unit 402 causes the temperature-and-humidity sensor 60 to detect the temperature and humidity, and acquires the detection result. Note that this detection may be continued from step S104. Next, in step S110, the second control unit 402 determines whether the humidity satisfies a determination condition. The determination condition is that the humidity is equal to or higher than the second humidity threshold value. The second control unit 402 returns to step S107 in a case where the humidity satisfies the determination condition, that is, the humidity is equal to or higher than the second humidity threshold value (Yes in step S110), and proceeds to step S111 in a case where the humidity does not satisfy the determination condition, that is, the humidity is less than the second humidity threshold value (No in step S110).

In step S111, the second control unit 402 stops the energization of the heater 50. Then, the first control unit 401 causes the image forming apparatus 1 to transition from the standby state to the sleep state. Furthermore, in step S112, the first control unit 401 causes the image forming apparatus 1 to transition from the sleep state to the deep sleep state. For example, the first control unit 401 transitions to the deep sleep state when the elapsed time of the sleep state reaches the second predetermined time.

For example, in the low humidity state, the processing of steps S101 to S105 and S112 can be repeated. In this case, as illustrated in FIG. 5A, the image forming apparatus 1 periodically and temporarily returns to the sleep state while maintaining the deep sleep state. In addition, in the high humidity state, the processing of steps S107 to S110 can be repeated. In this case, as illustrated in FIG. 5B, for example, the heater 50 can be continuously or intermittently energized in a daily use period, but the image forming apparatus 1 periodically and temporarily returns to the sleep state while maintaining the deep sleep state in periods other than the daily use period.

Effects and the Like

As described above, the image forming apparatus 1 according to the first embodiment includes the first control unit 401 to cause the image forming apparatus 1 to be in the standby state, the sleep state having smaller power consumption than the standby state, or the deep sleep state having smaller power consumption than the sleep state, the second control unit 402 to control the operation of the heater 50 that heats the inside of the image forming apparatus 1, and the temperature-and-humidity sensor 60 as the first detector 601 to detect the humidity of the inside of the image forming apparatus 1. The first control unit 401 causes the image forming apparatus 1 in the deep sleep state to periodically and temporarily return to the sleep state, and the second control unit 402 operates the heater 50 according to the humidity detected by the temperature-and-humidity sensor 60 in the sleep state having returned from the deep sleep state.

According to the above configuration, in the image forming apparatus 1 with the restricted functions for image formation, the sleep state having larger power consumption than the deep sleep state and the operation of the temperature-and-humidity sensor 60 are periodical and temporary. Further, the operation of the heater 50 is performed according to the detected humidity of the temperature-and-humidity sensor 60. Therefore, the image forming apparatus 1 can decrease the power consumption due to the sleep state, the power consumption due to the operation of the temperature-and-humidity sensor 60, and the power consumption due to the operation of the heater 50 when restricting the functions for image formation. Furthermore, the image forming apparatus 1 periodically detects the humidity and operates the heater 50 as required, thereby suppressing the high humidity of the inside and reducing the occurrence of dew condensation. Therefore, the image forming apparatus 1 can reduce the power consumption while improving the print quality.

Further, in the image forming apparatus 1 according to the first embodiment, the temperature-and-humidity sensor 60 may be stopped in the deep sleep state and may be operated in the sleep state having returned from the deep sleep state. According to the above configuration, the power consumption in the deep sleep state can be reduced, and power saving of the image forming apparatus 1 can be achieved.

Further, in the image forming apparatus 1 according to the first embodiment, the second predetermined time as the period of the sleep state periodically and temporarily having returned from the deep sleep state may be shorter than the first predetermined time as the period of the deep sleep state between the sleep states According to the above configuration, the period of the sleep state is short, and thus the power saving of the image forming apparatus 1 is possible.

Further, the image forming apparatus 1 according to the first embodiment controls the heater 50 on the basis of the humidity detected by the temperature-and-humidity sensor 60. However, the present invention is not limited to the control. For example, the image forming apparatus 1 may control the heater 50 on the basis of the humidity and the temperature detected by the temperature-and-humidity sensor 60. In this case, the first humidity threshold value and the second humidity threshold value may be set for each temperature. For example, since saturated vapor pressure becomes lower as the temperature is lower, the dew condensation is more likely to occur. Thus, the first humidity threshold value and the second humidity threshold value may be made lower as the temperature becomes lower. Then, the image forming apparatus 1 may control the heater 50 by comparing the first humidity threshold value and the second humidity threshold value corresponding to the detected temperature with the detected humidity.

Further, the image forming apparatus 1 according to the first embodiment operates the heater 50 in the standby state. However, the image forming apparatus 1 is not limited to having the above configuration, and may operate the heater 50 in the sleep state.

Second Embodiment

Figure 6:
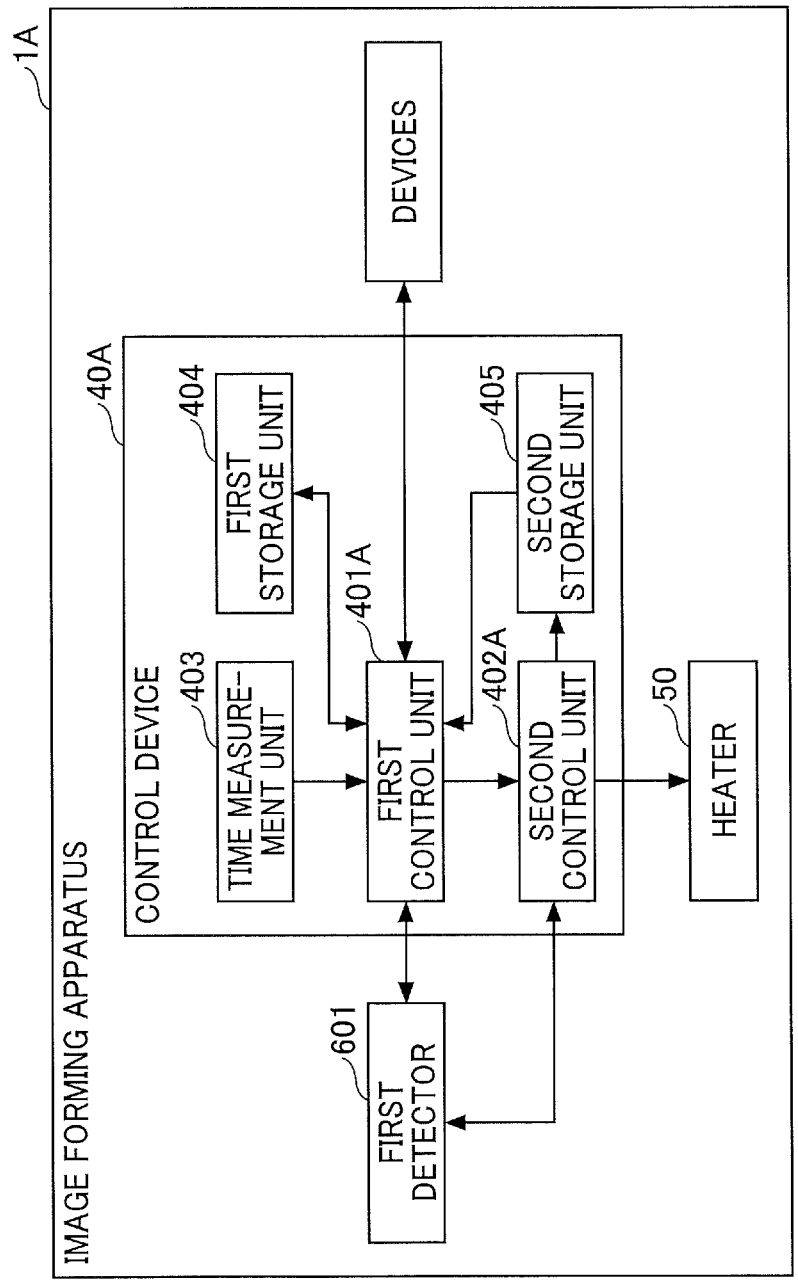
FIG. 6 is a block diagram illustrating an example of a functional configuration of a control device of an image forming apparatus according to a second embodiment.

An image forming apparatus 1A according to a second embodiment is different from the image forming apparatus 1 of the first embodiment in changing a periodic return cycle according to the number of times of operation of a heater 50. Hereinafter, regarding the second embodiment, points different from the first embodiment will be mainly described, and description of points similar to the first embodiment will be omitted as appropriate. First, a configuration of the image forming apparatus 1A according to the second embodiment will be described. FIG. 6 is a block diagram illustrating an example of a functional configuration of a control device 40A of the image forming apparatus 1A according to the second embodiment. Note that the hardware configuration of the control device 40A of the image forming apparatus 1A according to the second embodiment is similar to the configuration of the first embodiment.

As illustrated in FIG. 6, the configuration of the image forming apparatus 1A according to the second embodiment is similar to the configuration of the first embodiment except for the control device 40A. Then, the control device 40A includes a first control unit 401A and a second control unit 402A instead of the first control unit 401 and the second control unit 402, and further includes a second storage unit 405, with respect to the control device 40 according to the first embodiment. The second storage unit 405 is implemented by a ROM 414, a RAM 415, and the like in FIG. 3.

The second control unit 402A has a function to count the number of times of operation, which is the number of times when the heater 50 is operated, in addition to the function of the second control unit 402 according to the first embodiment. Then, the second control unit 402A causes the second storage unit 405 to store the number of times of operation of the heater 50. The second control unit 402A updates the number of times of operation stored in the second storage unit 405 to be incremented by one each time the operation of the heater 50 is counted. Then, the second control unit 402A calculates the number of times of operation per fourth predetermined time. An example of the fourth predetermined time is, but not limited to, one hour.

The second storage unit 405 stores the number of times of operation counted by the second control unit 402A, the fourth predetermined time, and the like.

The first control unit 401A similarly functions to the first control unit 401 according to the first embodiment. Furthermore, the first control unit 401A determines an elapsed time of a deep sleep state (hereinafter also referred to as "transition time") that is a determination criterion of causing the image forming apparatus 1A to return from the deep sleep state to a sleep state on the basis of a comparison result of the number of times of operation per the fourth predetermined time stored in the second storage unit 405 and a first threshold value. An example of the first threshold value is, but is not limited to, 10.

In a case where the number of times of operation per the fourth predetermined time is equal to or smaller than the first threshold value, the first control unit 401A determines the transition time to be a longer period. That is, the periodic return cycle becomes longer. Further, in a case where the number of times of operation per the fourth predetermined time is larger than the first threshold value, the first control unit 401A determines the transition time to be an initial value of the transition time. That is, the periodic return cycle is the same or becomes shorter. Any transition time determined as described above is a period equal to or longer than the initial value of the transition time. An example of the initial value is, but not limited to, a first predetermined time. An example of the transition time of a longer period is, but not limited to, a transition time twice as long as a previous transition time.

Furthermore, the first control unit 401A causes the first storage unit 404 to store the determined transition time. That is, the first control unit 401A updates the transition time stored in the first storage unit 404 using the determined transition time. The first storage unit 404 stores the transition time determined by the first control unit 401A, the first threshold value, and the like.

Then, when determining return of the image forming apparatus 1A from the deep sleep state to the sleep state, the first control unit 401A compares the elapsed time of the deep sleep state with the transition time stored in the first storage unit 404. Furthermore, the first control unit 401A puts the image forming apparatus 1A into the sleep state when the elapsed time reaches the transition time.

Next, an operation of the image forming apparatus 1A according to the second embodiment will be described. FIG. 7 is a flowchart illustrating an example of an operation of the image forming apparatus 1A according to the second embodiment. As illustrated in FIG. 7, the control device 40A of the image forming apparatus 1A performs processing of steps S101 to S108 in a similar manner to the first embodiment. In step S102, the first control unit 401A of the control device 40A uses a latest transition time "$T_n$" stored in the first storage unit 404 as a prescribed time.

In a case of Yes in step S108, the second control unit 402A of the control device 40A adds 1 to the number of times of operation "$K_{n-1}$" of the heater 50 stored in the second storage unit 405 to update the number of times of operation to "$K_n$ ($=K_{n-1}+1$)" (step S201). That is, the second control unit 402A counts up the number of times of ON of the heater 50 to update the number of times of operation.

Next, the second control unit 402A determines whether the elapsed time from an activation time of the heater 50 has reached one hour that is the fourth predetermined time (step S202). The second control unit 402A proceeds to step S204 in a case where the elapsed time has reached the fourth predetermined time, that is, one hour has elapsed (Yes in step S202), and proceeds to step S203 in a case where the elapsed time has not reached the fourth predetermined time, that is, one hour has not elapsed (No in step S202).

In step S203, the second control unit 402A causes the temperature-and-humidity sensor 60 to detect the temperature and humidity to acquire a detection result, and proceeds to step S110.

In step S204, the first control unit 401A determines whether the number of times of operation "$K_n$" after the update is equal to or smaller than the first threshold value "10". The first control unit 401A proceeds to step S206 in a case where the number of times of operation "$K_n$" is equal to or smaller than 10 (Yes in step S204), and proceeds to step S205 in a case where the number of times of operation "$K_n$" is larger than 10 (No in step S204).

In step S206, the first control unit 401A increases the transition time "$T_n$" stored in the first storage unit 404 to update the transition time to a new transition time. For example, the second control unit 402A updates the transition time to, but not limited to, a transition time "$T_n \times 2$" that is twice as long as the transition time "$T_n$". After the processing of step S206, the second control unit 402A proceeds to step S203.

In step S205, the first control unit 401A changes the transition time "$T_n$" stored in the first storage unit 404 to an initial value "T0" of the transition time to update the transition time to a new transition time. The initial value "T0" of the transition time may be a transition time set in advance and stored in the first storage unit 404 or may be a transition time set by a user. An example of the initial value "T0" is the first predetermined time. After the processing of step S205, the first control unit 401A proceeds to step S203.

Processing of steps S110 to S112 after step S203 is similar to the processing of the first embodiment.

According to the above-described image forming apparatus 1A of the second embodiment, effects similar to the effects of the image forming apparatus 1 according to the first embodiment can be obtained. Further, in the image forming apparatus 1A according to the second embodiment, the second control unit 402A accumulates the number of times of operation of the heater 50 in the second storage unit 405, and the first control unit 401A makes a cycle of periodic return from the deep sleep state into the sleep state long in a case where the number of times is equal to or smaller than the first threshold value, and makes the cycle short in a case where the number of times is larger than the first threshold value.

According to the above configuration, the image forming apparatus 1A changes the periodic return cycle according to use record of the heater 50. Specifically, the image forming apparatus 1A decreases the frequency of the periodic return under an environment where the use frequency of the heater 50 is small, thereby decreasing power consumption due to the sleep state. Further, the image forming apparatus 1A increases the frequency of the periodic return under an environment where the use frequency of the heater 50 is large, thereby operating the heater 50 corresponding to change in the humidity. That is, the image forming apparatus 1A can improve print quality.

Further, the image forming apparatus 1A according to the second embodiment changes the transition time according to the number of times of operation of the heater 50. However, the embodiment is not limited to the configuration. For example, the image forming apparatus 1A may change at least one of a period of the sleep state at the time of periodic return and an operation period of the heater 50 according to the number of times of operation of the heater 50. These changes may be used together with the change of the transition time or may be separately used. For example, in a case where the number of times of operation of the heater 50 is equal to or smaller than the first threshold value, the image forming apparatus 1A may make at least one of the period of the sleep state and the operation period of the heater 50 short. Meanwhile, in a case where the number of times of operation of the heater 50 is larger than the first threshold value, the image forming apparatus 1A may make at least one of the period of the sleep state and the operation period of the heater 50 long.

Further, the image forming apparatus 1A according to the second embodiment changes the transition time to the initial value in the case where the number of times of operation of the heater 50 is larger than the first threshold value. However, the embodiment is not limited to the configuration. The image forming apparatus 1A may change the transition time to a shorter transition time.

Third Embodiment

An image forming apparatus 1B according to a third embodiment is different from the image forming apparatus 1 of the first embodiment in changing a periodic return cycle according to an accumulated time of operation of a heater 50. Hereinafter, regarding the third embodiment, points different from the first and second embodiments will be mainly described, and description of points similar to the first and second embodiments will be omitted as appropriate.

Figure 8:
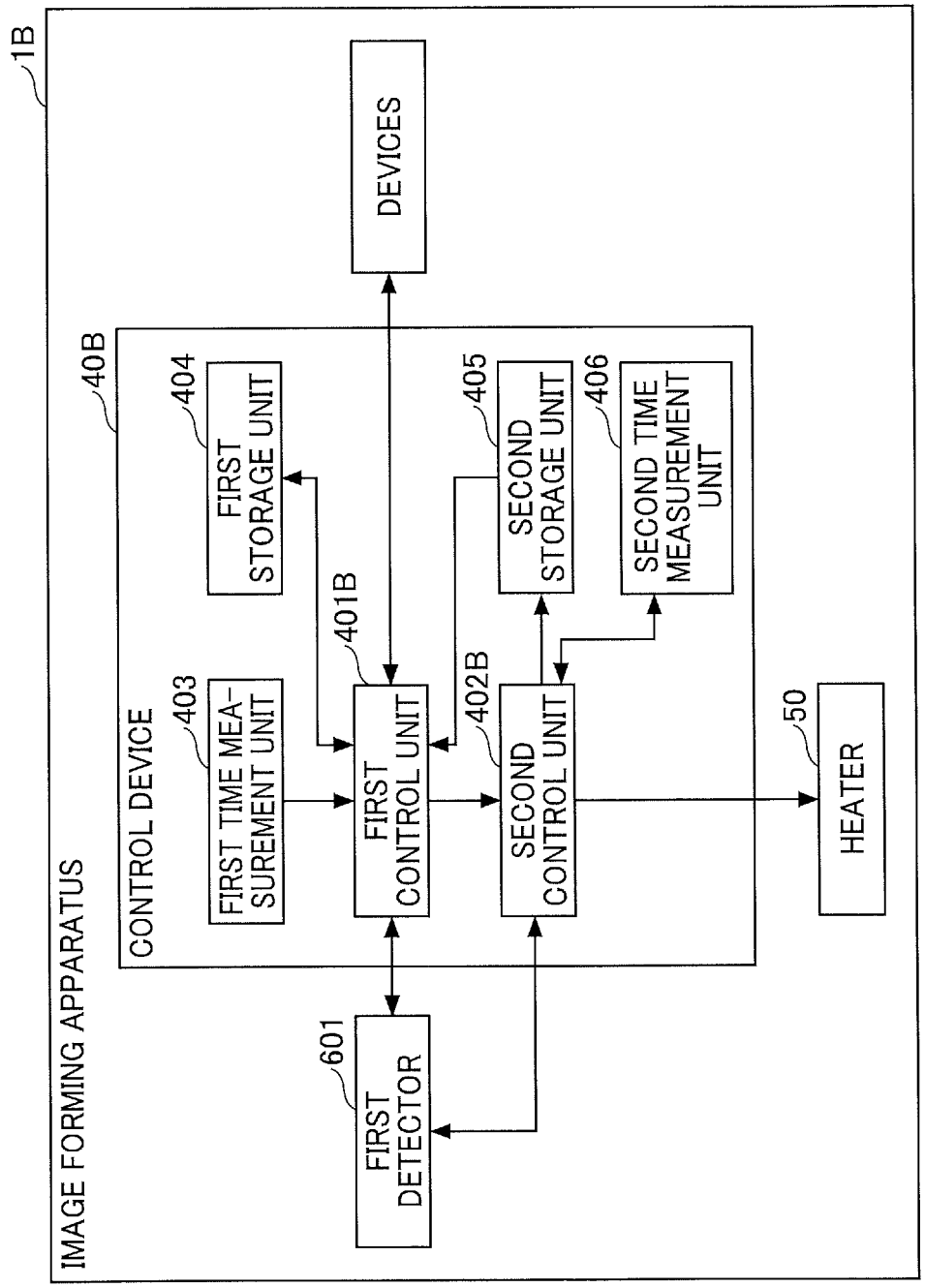
FIG. 8 is a block diagram illustrating an example of a functional configuration of a control device of an image forming apparatus according to a third embodiment.
Figure 9:
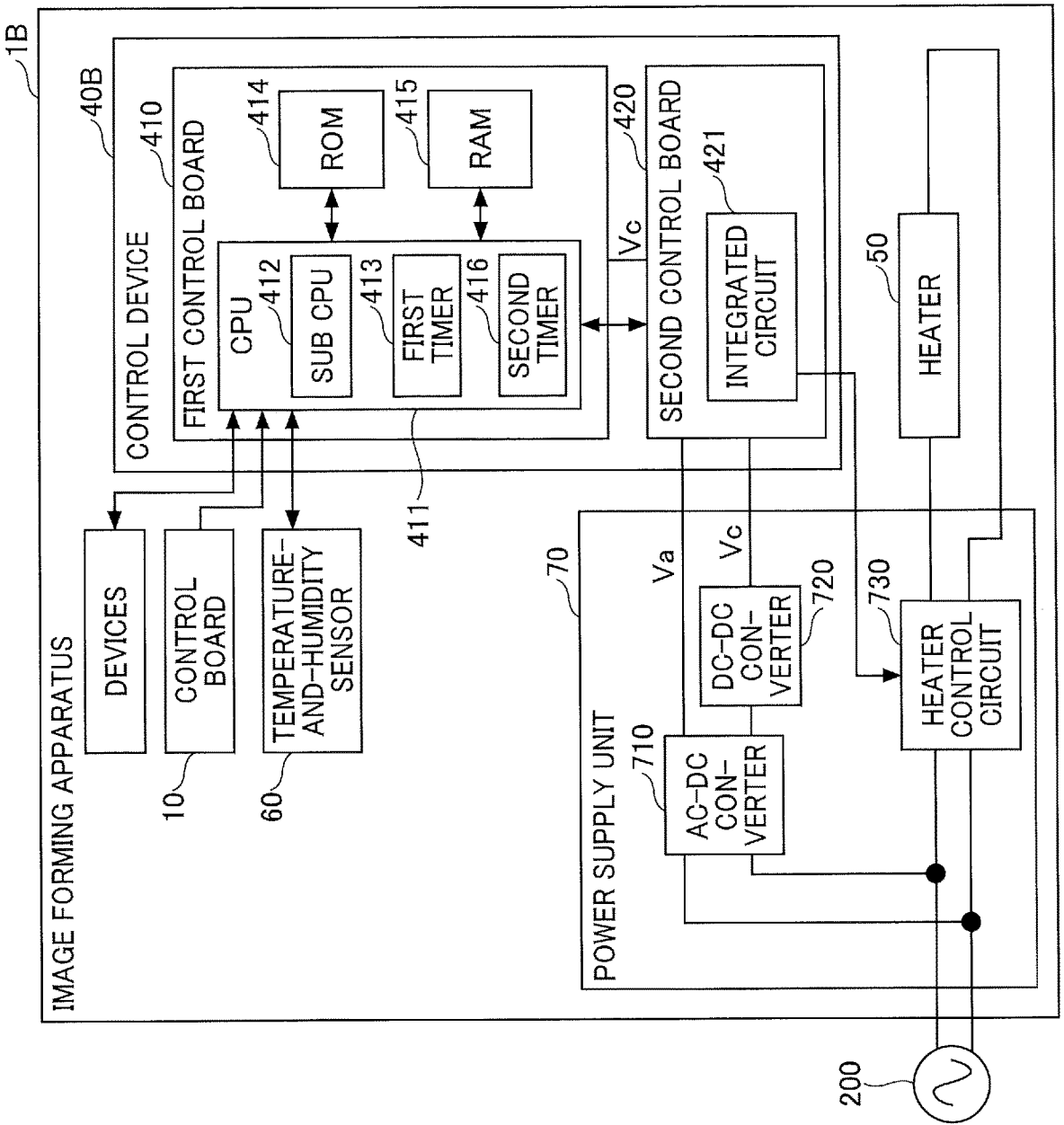
FIG. 9 is a block diagram illustrating an example of a hardware configuration of the control device of the image forming apparatus according to the third embodiment.

First, a configuration of the image forming apparatus 1B according to the third embodiment will be described. FIG. 8 is a block diagram illustrating an example of a functional configuration of a control device 40B of the image forming apparatus 1B according to the third embodiment. FIG. 9 is a block diagram illustrating an example of a hardware configuration of the control device 40B of the image forming apparatus 1B according to the third embodiment.

As illustrated in FIG. 8, the functional configuration of the image forming apparatus 1B according to the third embodiment is similar to the functional configuration of the first embodiment except for the control device 40B. Then, the control device 40B includes a first control unit 401B and a second control unit 402B instead of the first control unit 401 and the second control unit 402, and further includes a second storage unit 405 and a second time measurement unit 406, with respect to the control device 40 according to the first embodiment. Then, the control device 40B includes a time measurement unit 403 as a first time measurement unit.

As illustrated in FIG. 9, the hardware configuration of the image forming apparatus 1B according to the third embodiment is similar to the hardware configuration of the first embodiment except for the control device 40B. A CPU 411 of the control device 40B includes a sub CPU 412, a timer 413 as a first timer, and a second timer 416. The first time measurement unit 403 is implemented by the first timer 413 and the like, and the second time measurement unit 406 is implemented by the second timer 416 and the like.

As illustrated in FIG. 8, the second time measurement unit 406 operates in accordance with a command of the second control unit 402B and measures an operation time of the heater 50. The second time measurement unit 406 outputs a measurement time to the second control unit 402B.

The second control unit 402B has a function to calculate an accumulated time that is an integrated value of time in which the heater 50 is operated, in addition to the function of the second control unit 402 according to the first embodiment. Specifically, the second control unit 402B causes the second time measurement unit 406 to measure an elapsed time during the operation of the heater 50. The second control unit 402B acquires an operation time of the heater 50 measured by the second time measurement unit 406 and causes the second storage unit 405 to store the operation time. The second control unit 402B adds the acquired operation time to the accumulated time of the operation time stored in the second storage unit 405 each time the second control unit 402B acquires the operation time of the heater 50 to calculate a new accumulated time, and updates the accumulated time stored in the second storage unit 405. Then, the second control unit 402B calculates the accumulated time of the operation time measured during a fifth predetermined time. An example of the fifth predetermined time is, but not limited to, one week.

The second storage unit 405 stores the accumulated time calculated by the second control unit 402A, the fifth predetermined time, and the like.

The first control unit 401B similarly functions to the first control unit 401 according to the first embodiment. Furthermore, the first control unit 401B determines a transition time of the image forming apparatus 1B on the basis of a comparison result of the accumulated time of the operation time of the heater 50 over the fifth predetermined time stored in the second storage unit 405 and a second threshold value. An example of the second threshold value is, but not limited to, 1440 minutes.

In a case where the accumulated time over the fifth predetermined time is equal to or smaller than the second threshold value, the first control unit 401B determines the transition time to be a longer period. Further, in a case where the accumulated time over the fifth predetermined time is longer than the second threshold value, the first control unit 401B determines the transition time to be an initial value of the transition time. Any transition time determined as described above is a period equal to or longer than the initial value of the transition time. An example of the initial value is, but not limited to, a first predetermined time. An example of the transition time of a longer period is, but not limited to, a transition time twice as long as a previous transition time.

Furthermore, the first control unit 401B causes the first storage unit 404 to store the determined transition time. That is, the first control unit 401B updates the transition time stored in the first storage unit 404 using the determined transition time. The first storage unit 404 stores the transition time determined by the first control unit 401B, the second threshold value, and the like.

Then, when determining return of the image forming apparatus 1B from a deep sleep state to a sleep state, the first control unit 401B compares an elapsed time of the deep sleep state with the transition time stored in the first storage unit 404. Furthermore, the first control unit 401B puts the image forming apparatus 1B into the sleep state when the elapsed time reaches the transition time.

Figure 10A:
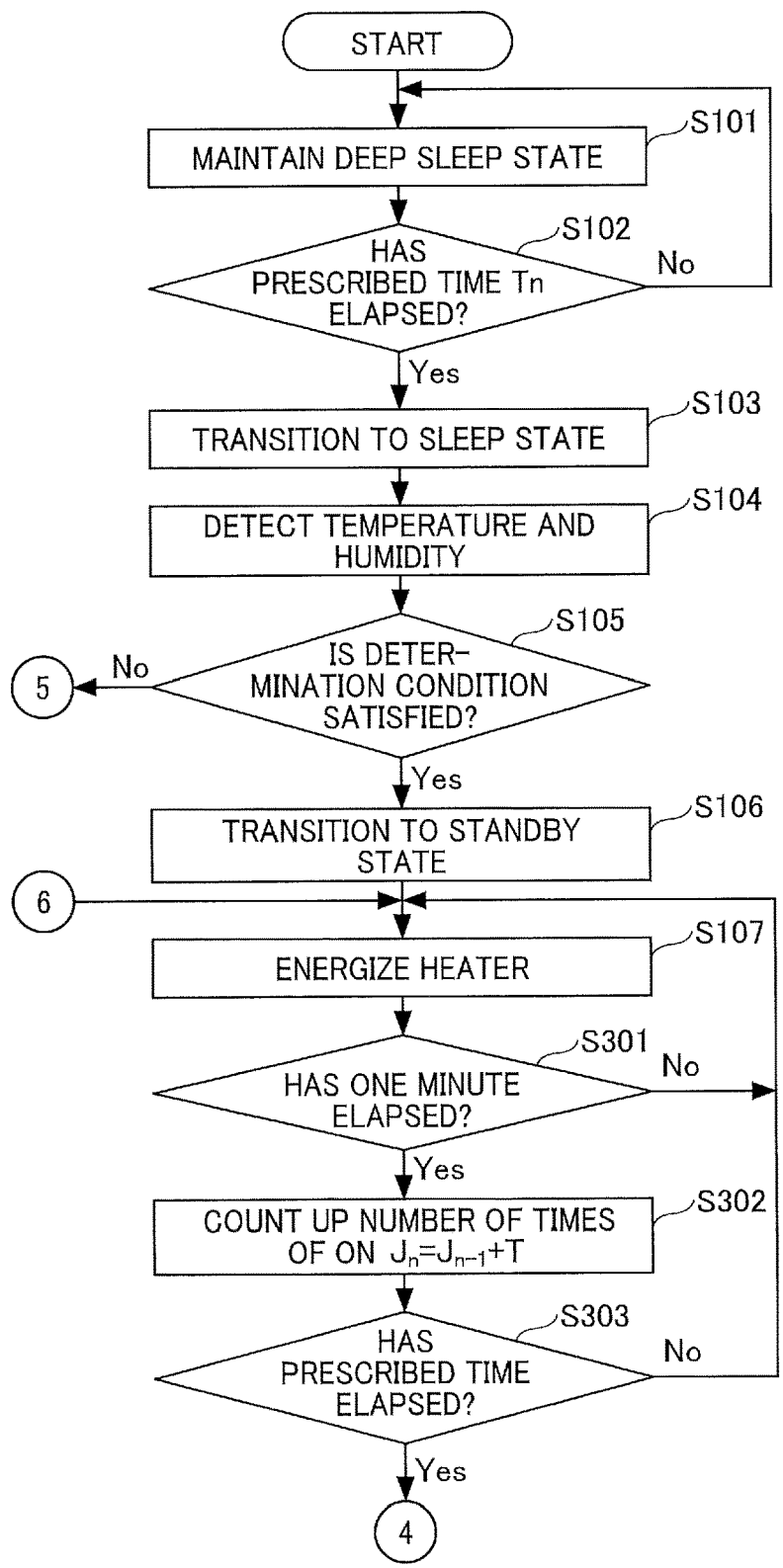
FIG. 10 (including FIGS. 10A and 10B) is a flowchart illustrating an example of an operation of the image forming apparatus according to the third embodiment.
Figure 10B:
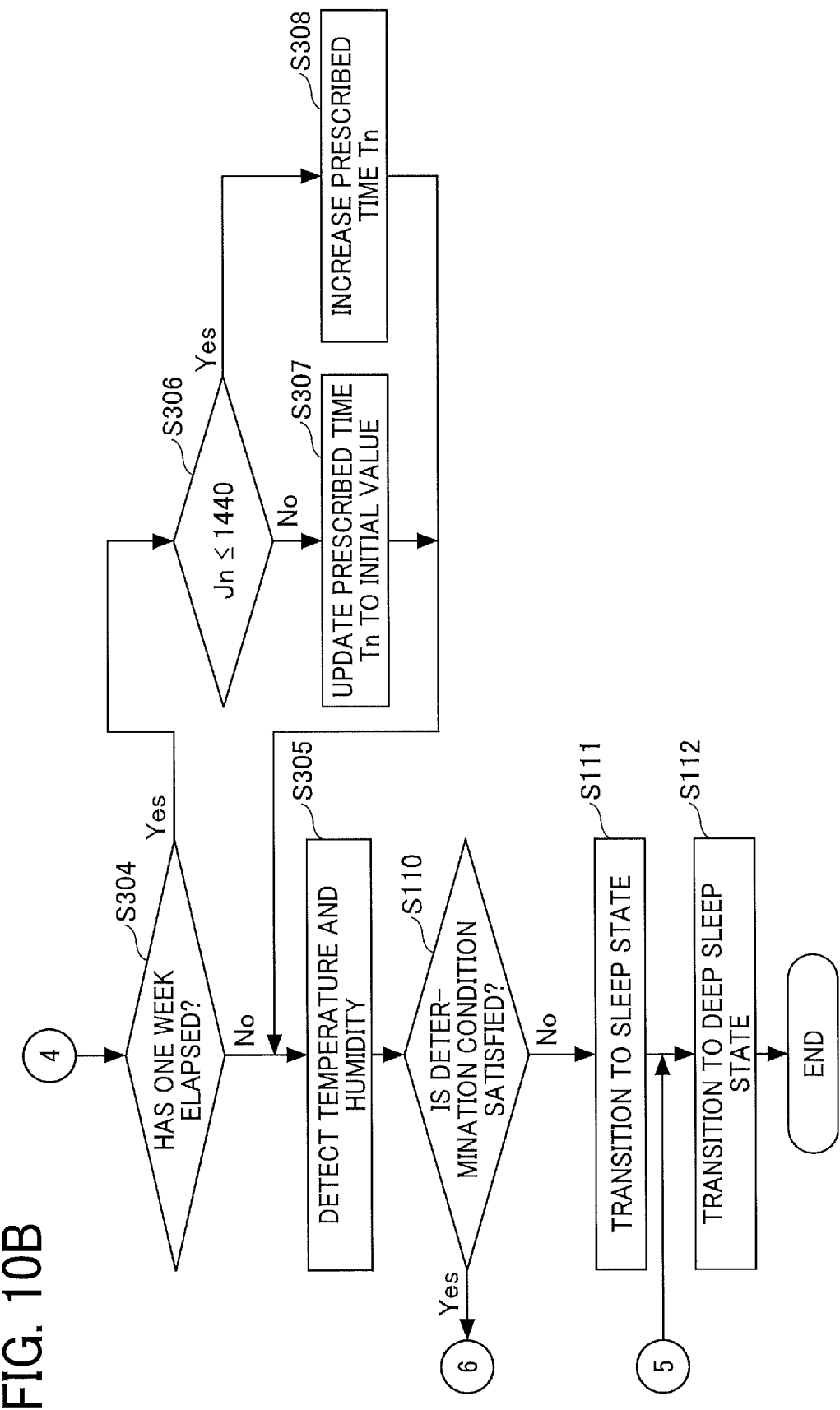

Next, an operation of the image forming apparatus 1B according to the third embodiment will be described. FIG. 10 is a flowchart illustrating an example of an operation of the image forming apparatus 1B according to the third embodiment. As illustrated in FIG. 10, the control device 40B of the image forming apparatus 1B performs processing of steps S101 to S107 in a similar manner to the first embodiment. In step S102, the first control unit 401B of the control device 40B uses a latest transition time "$T_n$" stored in the first storage unit 404 as a prescribed time. Further, in step S107, the second control unit 402B of the control device 40B activates the heater 50 and the second time measurement unit 406.

After the processing of step S107, the second control unit 402B determines whether the operation time of the heater 50 acquired from the second time measurement unit 406 has reached a sixth predetermined time (step S301). An example of the sixth predetermined time is, but not limited to, one minute. For example, the sixth predetermined time may be a time in which the second control unit 402B can determine that the heater 50 is activated, a time required for the heater 50 to generate heat from an energization time of the heater 50, or a time required for heat generation of the heater 50 to stabilize from the energization time of the heater 50, or the like. The second control unit 402A proceeds to step S302 in a case where one minute has elapsed (Yes in step S301), and returns to step S107 in a case where one minute has not elapsed (No in step S301).

In step S302, the second control unit 402B adds an operation time "T" of the heater 50 acquired from the second time measurement unit 406 to an accumulated time "$J_{n-1}$" of the heater 50 stored in the second storage unit 405 to update the accumulated time to "$J_n$ $(=J_{n-1}+T)$". That is, the second control unit 402B counts up the operation time of the heater 50 to update the accumulated time.

Next, the second control unit 402B determines whether an elapsed time from an activation time of the heater 50 has reached a third predetermined time that is a prescribed time (step S303). The second control unit 402B proceeds to step S304 in a case where the elapsed time has reached the third predetermined time (Yes in step S303), and returns to step S107 in a case where the elapsed time has not reached the third predetermined time (No in step S303).

In step S304, the second control unit 402B determines whether one week that is the fifth predetermined time has elapsed from a start time of integration of the operation time with respect to the accumulated time of the second storage unit 405. That is, the second control unit 402B determines whether the accumulated time includes the operation time up to a point of time when one week dates back from the present. The second control unit 402B proceeds to step S306 in a case where one week has elapsed (Yes in step S304), and proceeds to step S305 in a case where one week has not elapsed (No in step S304).

In step S305, the second control unit 402B causes a temperature-and-humidity sensor 60 to detect the temperature and humidity to acquire a detection result, and proceeds to step S110.

In step S306, the first control unit 401B determines whether an accumulated time "$J_n$" after the update is equal to or smaller than the second threshold value "1440 minutes". The first control unit 401B proceeds to step S308 in a case where the accumulated time "$J_n$" is equal to or shorter than 1440 minutes (Yes in step S306), and proceeds to step S307 in a case where the accumulated time "$J_n$" is longer than 1440 minutes (No in step S306).

In step S308, the first control unit 401B increases the transition time "$T_n$" stored in the first storage unit 404 to update the transition time to a new transition time. After the processing of step S308, the first control unit 401B proceeds to step S305.

In step S307, the first control unit 401B changes the transition time "$T_n$" stored in the first storage unit 404 to an initial value "T0" of the transition time to update the transition time to a new transition time. After the processing of step S307, the first control unit 401B proceeds to step S305.

Processing of steps S110 to S112 after step S305 is similar to the processing of the first embodiment.

According to the above-described image forming apparatus 1B of the third embodiment, effects similar to the effects of the image forming apparatus 1 according to the first embodiment can be obtained. Further, in the image forming apparatus 1B according to the third embodiment, the second control unit 402B accumulates the accumulated time of operation of the heater 50 in the second storage unit 405, and the first control unit 401B makes a cycle of periodic return from the deep sleep state into the sleep state long in a case where the accumulated time is equal to or shorter than the second threshold value, and makes the cycle short in a case where the accumulated time is longer than the second threshold value.

According to the above configuration, the image forming apparatus 1B changes the periodic return cycle according to use record of the heater 50. Specifically, the image forming apparatus 1B decreases the frequency of the periodic return under an environment where the use time of the heater 50 is short, thereby decreasing power consumption due to the sleep state. Further, the image forming apparatus 1B increases the frequency of the periodic return under an environment where the use time of the heater 50 is long, thereby operating the heater 50 corresponding to change in the humidity. That is, the image forming apparatus 1B can improve print quality.

Further, the image forming apparatus 1B according to the third embodiment changes the transition time according to the accumulated time of the heater 50. However, the embodiment is not limited to the configuration. For example, the image forming apparatus 1B may change at least one of a period of the sleep state at the time of periodic return and an operation period of the heater 50 according to the accumulated time of the heater 50. These changes may be used together with the change of the transition time or may be separately used. For example, in a case where the accumulated time of the heater 50 is equal to or shorter than the second threshold value, the image forming apparatus 1B may make at least one of the period of the sleep state and the operation period of the heater 50 short. Meanwhile, in a case where the accumulated time of the heater 50 is longer than the second threshold value, the image forming apparatus 1B may make at least one of the period of the sleep state and the operation period of the heater 50 long.

Further, the image forming apparatus 1B according to the third embodiment changes the transition time to the initial value in the case where the accumulated time of the heater 50 is longer than the second threshold value. However, the embodiment is not limited to the configuration. The image forming apparatus 1B may change the transition time to a shorter transition time.

Fourth Embodiment

Figure 11:
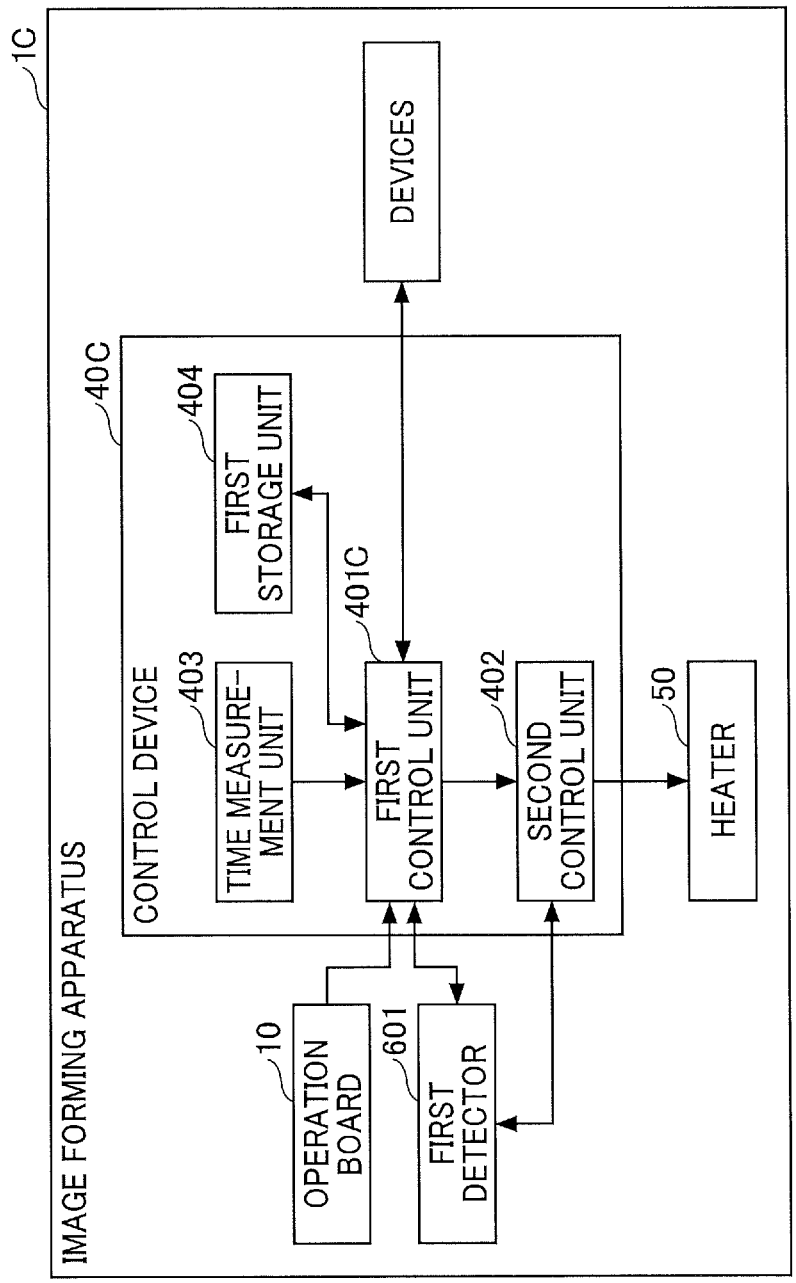
FIG. 11 is a block diagram illustrating an example of a functional configuration of a control device of an image forming apparatus according to a fourth embodiment.

An image forming apparatus 1C according to a fourth embodiment is different from the image forming apparatus 1 of the first embodiment in preferentially performing return corresponding to an input of a user to an operation board 10 to periodic return, regarding return from a deep sleep state to a sleep state. Hereinafter, regarding the fourth embodiment, points different from the first to third embodiments will be mainly described, and description of points similar to the first to third embodiments will be omitted as appropriate. The image forming apparatus 1C according to the fourth embodiment will be described. FIG. 11 is a block diagram illustrating an example of a functional configuration of a control device 40C of an image forming apparatus 1C according to the fourth embodiment. Note that the hardware configuration of the control device 40C of the image forming apparatus 1C according to the fourth embodiment is similar to the hardware configuration of the first embodiment. As illustrated in FIG. 11, the configuration of the image forming apparatus 1C according to the fourth embodiment is similar to the configuration of the first embodiment except for the control device 40C. Then, the control device 40C includes a first control unit 401C instead of the first control unit 401, with respect to the control device 40 according to the first embodiment.

The first control unit 401C is connected to a first detector 601 and the operation board 10. The first control unit 401C acquires, from the operation board 10, information regarding presence or absence of an input to the operation board 10. When acquiring the information indicating the input to the operation board 10, the first control unit 401C causes the image forming apparatus 1C in the deep sleep state to return to the sleep state, and further causes the image forming apparatus 1C to transition to the standby state according to detected humidity. At this time, the first control unit 401C gives priority to return due to the above input over periodic return, and omits processing of the periodic return. Specifically, the first control unit 401C regards the return due to the input as the periodic return, and omits the periodic return corresponding to the return due to the input. The correspondence between the return due to the input and the periodic return may be arbitrarily set. For example, the return due to one input may be associated with one periodic return or may be associated with two or more periodic returns.

Figure 12A:
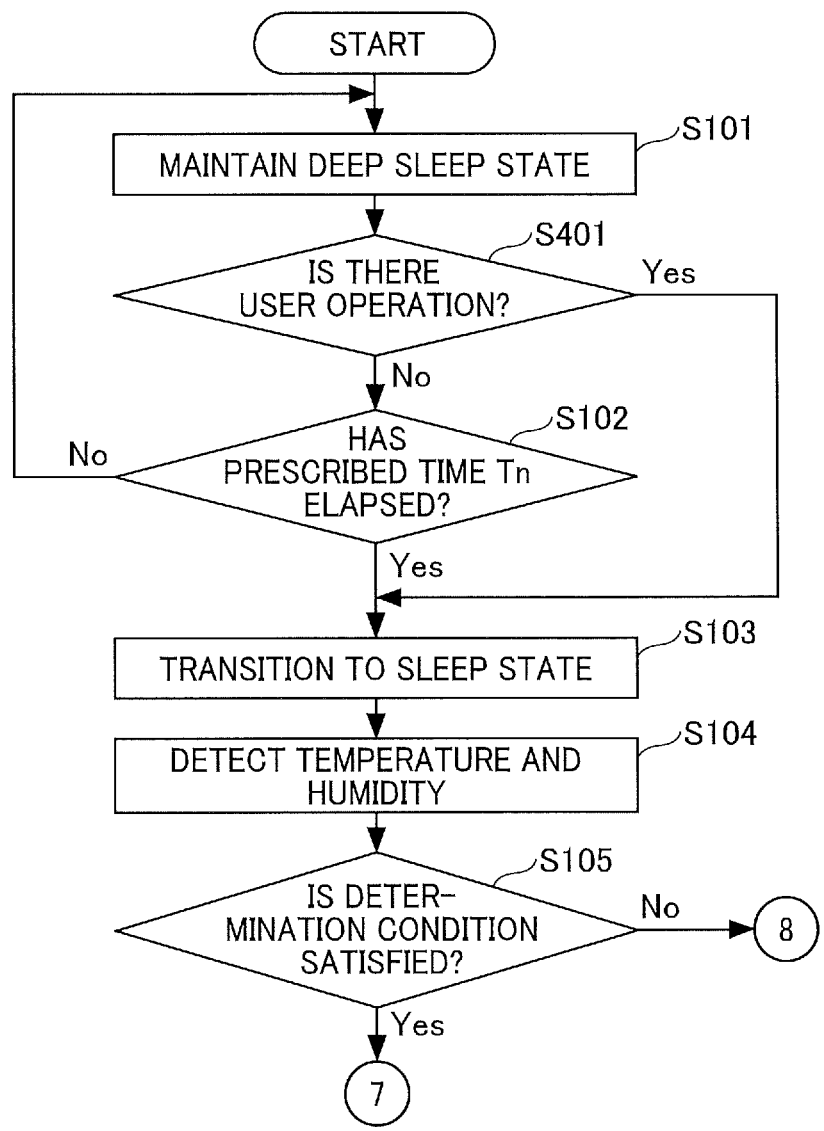
FIG. 12 (including FIGS. 12A and 12B) is a flowchart illustrating an example of an operation of the image forming apparatus according to the fourth embodiment.
Figure 12B:
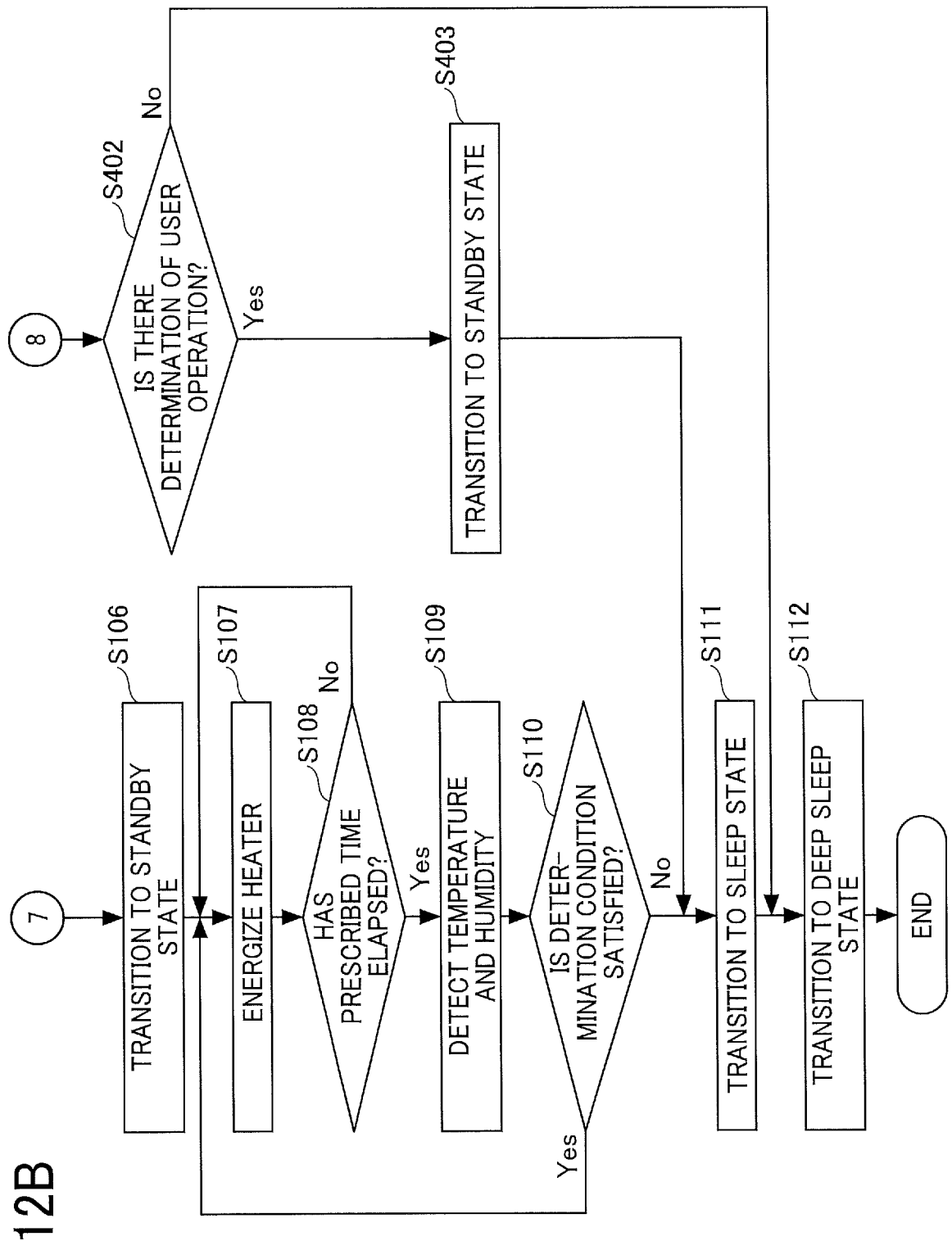

FIG. 12 is a flowchart illustrating an example of an operation of the image forming apparatus 1C according to the fourth embodiment. As illustrated in FIG. 12, the control device 40C of the image forming apparatus 1C performs processing of steps S101 to S112 in a similar manner to the first embodiment.

Furthermore, the first control unit 401C of the control device 40C determines whether there is an input to the operation board 10, that is, there is an operation input by the user, during steps S101 and S102 (step S401). The first control unit 401C omits the determination of the elapsed time of the deep sleep state in step S102 and proceeds to step S103 in a case where there is the input (Yes in step S401), and proceeds to step S102 in a case where there is no input (No in step S401).

Further, in step S105, the first control unit 401C proceeds to step S106 in a case where the humidity is equal to or higher than a first humidity threshold value (Yes in step S105), and proceeds to step S402 in a case where the humidity is less than the first humidity threshold value (No in step S105).

In step S402, the first control unit 401C confirms the determination result in step S401. That is, in step S401, the first control unit 401C determines whether there is determination that there is the operation input of the user. The first control unit 401C proceeds to step S403 in a case of the determination that there is the input (Yes in step S402), and proceeds to step S112 in a case of the determination that there is no input (No in step S402).

In step S403, the first control unit 401C causes the image forming apparatus 1C to transition from the sleep state to the standby state. The first control unit 401C proceeds to step S111 in a case where the image forming apparatus 1C does not operate for a certain time after the transition, and otherwise maintains the standby state.

According to the above-described image forming apparatus 1C of the fourth embodiment, effects similar to the effects of the image forming apparatus 1 according to the first embodiment can be obtained. Furthermore, in the image forming apparatus 1C according to the fourth embodiment, the first control unit 401C causes the image forming apparatus 1C to return to the sleep state instead of periodic return from the deep sleep state to the sleep state when acquiring the operation input to the image forming apparatus 1C in the deep sleep state. According to the above configuration, the image forming apparatus 1C regards the return due to the operation input as the periodic return, thereby suppressing an increase in the number of returns due to duplication. Therefore, power consumption can be reduced.

Fifth Embodiment

An image forming apparatus 1D according to a fifth embodiment is different from the image forming apparatus 1 of the first embodiment in changing a periodic return cycle according to a preset temporal use frequency of the image forming apparatus 1D. Hereinafter, regarding the fifth embodiment, points different from the first to fourth embodiments will be mainly described, and description of points similar to the first to fourth embodiments will be omitted as appropriate.

Figure 13:
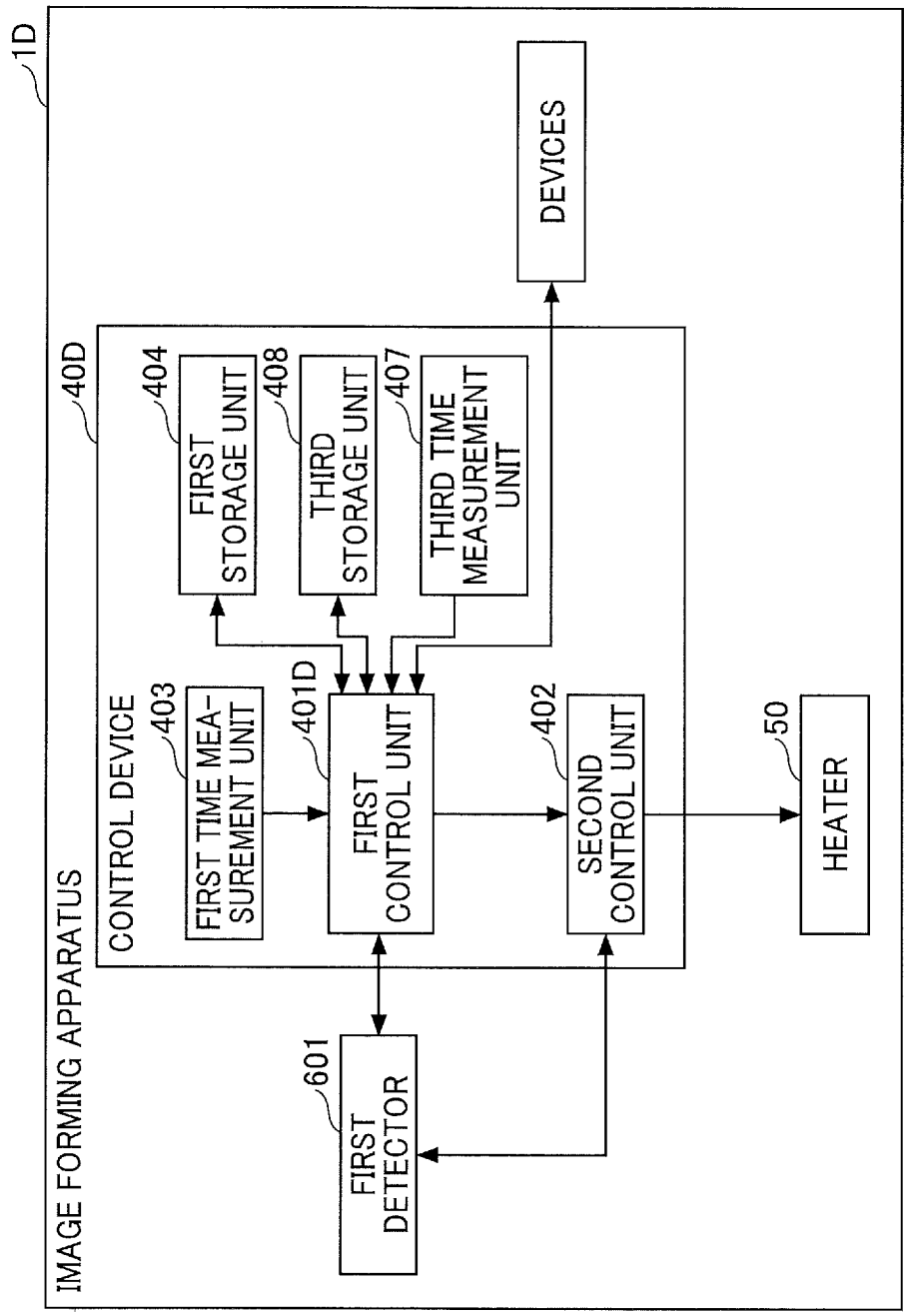
FIG. 13 is a block diagram illustrating an example of a functional configuration of a control device of an image forming apparatus according to a fifth embodiment.

The image forming apparatus 1D according to the fifth embodiment will be described. FIG. 13 is a block diagram illustrating an example of a functional configuration of a control device 40D of an image forming apparatus 1D according to the fifth embodiment. Note that the hardware configuration of the control device 40D of the image forming apparatus 1D according to the fifth embodiment is similar to the hardware configuration in FIG. 9. As illustrated in FIG. 13, the configuration of the image forming apparatus 1D according to the fifth embodiment is similar to the configuration of the first embodiment except for the control device 40D. Then, the control device 40D includes a first control unit 401D instead of the first control unit 401 and further includes a third time measurement unit 407 and a third storage unit 408, with respect to the control device 40 according to the first embodiment. The third storage unit 408 is implemented by a ROM 414, a RAM 415, and the like in FIG. 9, and the third time measurement unit 407 is implemented by a second timer 416 and the like.

The third storage unit 408 stores busy and slack information that is temporal information of the use frequency of the image forming apparatus 1D. The busy and slack information may be created in advance by, for example, a user, a manufacturer, a seller, or a maintenance agent of the image forming apparatus 1D, and may be stored in the third storage unit 408.

The busy and slack information may be, for example, information indicating a temporal change in the use frequency of the image forming apparatus 1D. The temporal change in the use frequency may be a temporal change in the use frequency in one year, a temporal change in the use frequency in one month, a temporal change in the use frequency in one week, a temporal change in the use frequency in one day, or a temporal change in the use frequency of a combination of at least two of the aforementioned use frequencies. Examples of the unit of the temporal change include seasonal, half-year, and quarter periods, month, week, day, hour, minute, and second. For example, in a case where the image forming apparatus 1D is used in a business company, the temporal change in the use frequency may indicate business hours, close hours, a business day, a weekly regular holiday, a special holiday such as a long vacation, a busy season, a low season, or the like.

Furthermore, the third storage unit 408 stores the use frequency and a periodic return cycle corresponding to the use frequency in association with each other. For example, the periodic return cycle may be associated with the use frequency regarding a high region with a high use frequency, a low region with a low use frequency, and an intermediate region between the high region and the low region. The periodic return cycle in the high region is shorter than or the same as the periodic return cycle in the intermediate region, and the periodic return cycle in the low region may be longer than the periodic return cycle in the intermediate region or may be infinite. In the case where the periodic return cycle is infinite, the periodic return is canceled. The reference of high or low of the use frequency can be arbitrarily set according to the use environment or the like of the image forming apparatus 1D. The third time measurement unit 407 measures a time and outputs the time to the first control unit 401D. The time can include year, month, and date.

The first control unit 401D similarly functions to the first control unit 401 according to the first embodiment. Furthermore, the first control unit 401D specifies the use frequency corresponding to the time by referring to the third storage unit 408 on the basis of the time detected by the third time measurement unit 407, and determines the periodic return cycle according to the specified use frequency. Further, the first control unit 401D may specify the use frequency corresponding to the time detected by the third time measurement unit 407 and a time on and after the detected time by referring to the busy and slack information, and determine the periodic return cycle of the time on and after the detected time.

Figure 14A:
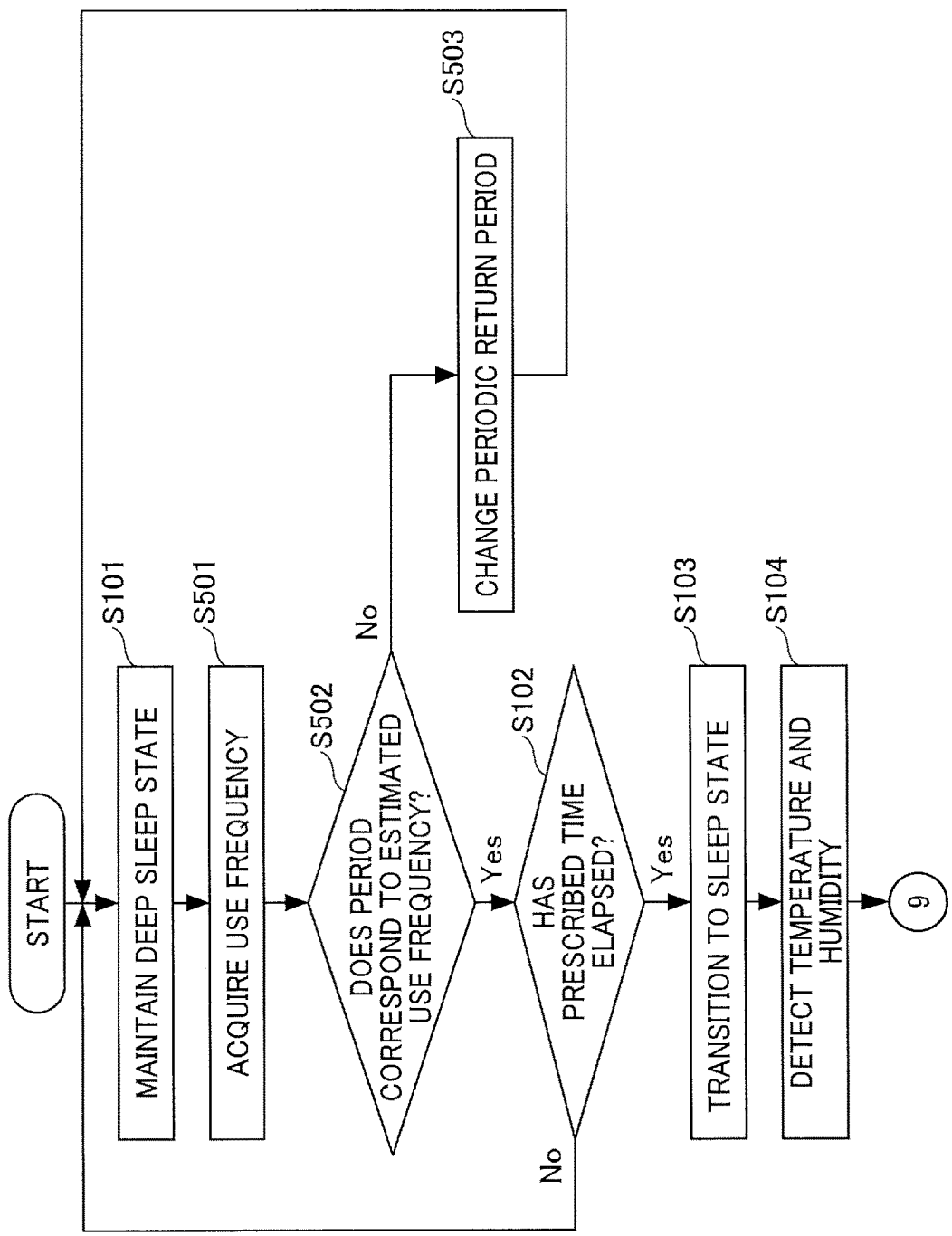
FIG. 14 (including FIGS. 14A and 14B) is a flowchart illustrating an example of an operation of the image forming apparatus according to the fifth embodiment.
Figure 14B:
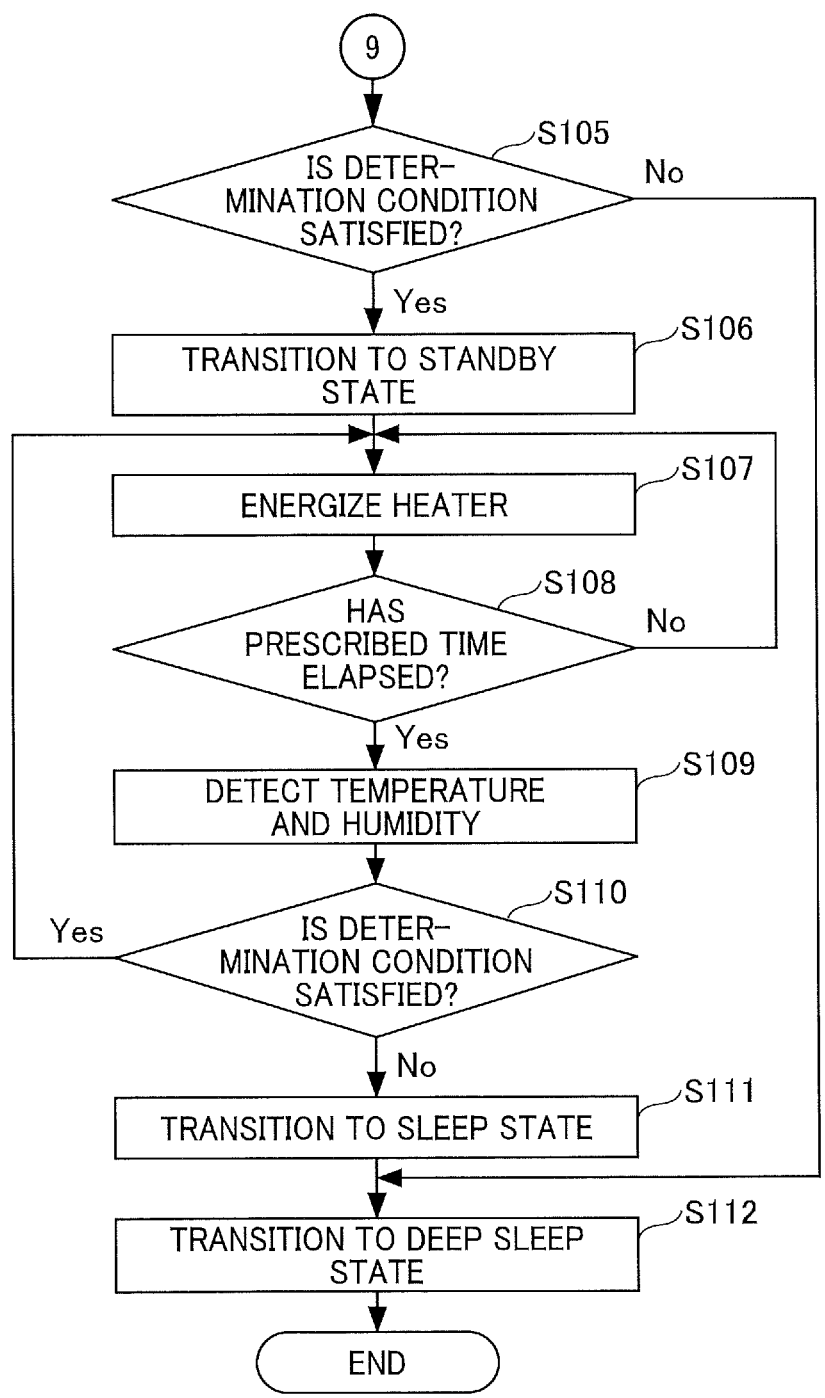

FIG. 14 is a flowchart illustrating an example of an operation of the image forming apparatus 1D according to the fifth embodiment. As illustrated in FIG. 14, the control device 40D of the image forming apparatus 1D performs processing of steps S101 to S112 in a similar manner to the first embodiment.

Furthermore, the first control unit 401D of the control device 40D acquires an assumed use frequency that is the use frequency of the image forming apparatus 1D assumed at the current time between steps S101 and S102 (step S501). Specifically, the first control unit 401D acquires the use frequency of the image forming apparatus 1D corresponding to the time acquired from the third time measurement unit 407 by referring to the busy and slack information stored in the third storage unit 408 as the assumed use frequency.

Next, the first control unit 401D determines whether the periodic return cycle currently set in the image forming apparatus 1D corresponds to the assumed use frequency (step S502). Specifically, the first control unit 401D specifies the use frequency corresponding to the currently set cycle by referring to the third storage unit 408, and determines whether the specified use frequency corresponds to the assumed use frequency. The first control unit 401D proceeds to step S102 in a case where the specified use frequency corresponds to the assumed use frequency (Yes in step S502), and proceeds to step S503 in a case where the specified use frequency does not correspond to the assumed use frequency (No in step S502).

In step S503, the first control unit 401D changes the periodic return cycle to correspond to the assumed use frequency by referring to the third storage unit 408. After the processing of step S503, the first control unit 401D returns to step S101.

According to the above-described image forming apparatus 1D of the fifth embodiment, effects similar to the effects of the image forming apparatus 1 according to the first embodiment can be obtained. Furthermore, the image forming apparatus 1D according to the fifth embodiment includes the third time measurement unit 407 that measures the time, and the third storage unit 408 that stores the busy and slack information that is the temporal information of the use frequency of the image forming apparatus 1D. The first control unit 401D specifies the use frequency of the image forming apparatus 1D on the basis of the time detected by the third time measurement unit 407, and changes the cycle of periodic return from the deep sleep state to the sleep state according to the specified use frequency. According to the above configuration, the image forming apparatus 1D changes the periodic return cycle according to the use frequency specified from the busy and slack information. For example, in a case where the use frequency is low, the image forming apparatus 1D can decrease power consumption due to the return to the sleep state by making the cycle long. For example, the image forming apparatus 1D decreases the frequency of the periodic return or eliminates the periodic return in a time zone, a day, or a period in which the use of the image forming apparatus 1D is not assumed, thereby effectively decreasing the power consumption.

Sixth Embodiment

An image forming apparatus 1E according to a sixth embodiment is different from the image forming apparatus 1D of the fifth embodiment in estimating a temporal use frequency of the image forming apparatus 1E and changing a periodic return cycle according to the estimated use frequency. Hereinafter, regarding the sixth embodiment, points different from the first to fifth embodiments will be mainly described, and description of points similar to the first to fifth embodiments will be omitted as appropriate.

Figure 15:
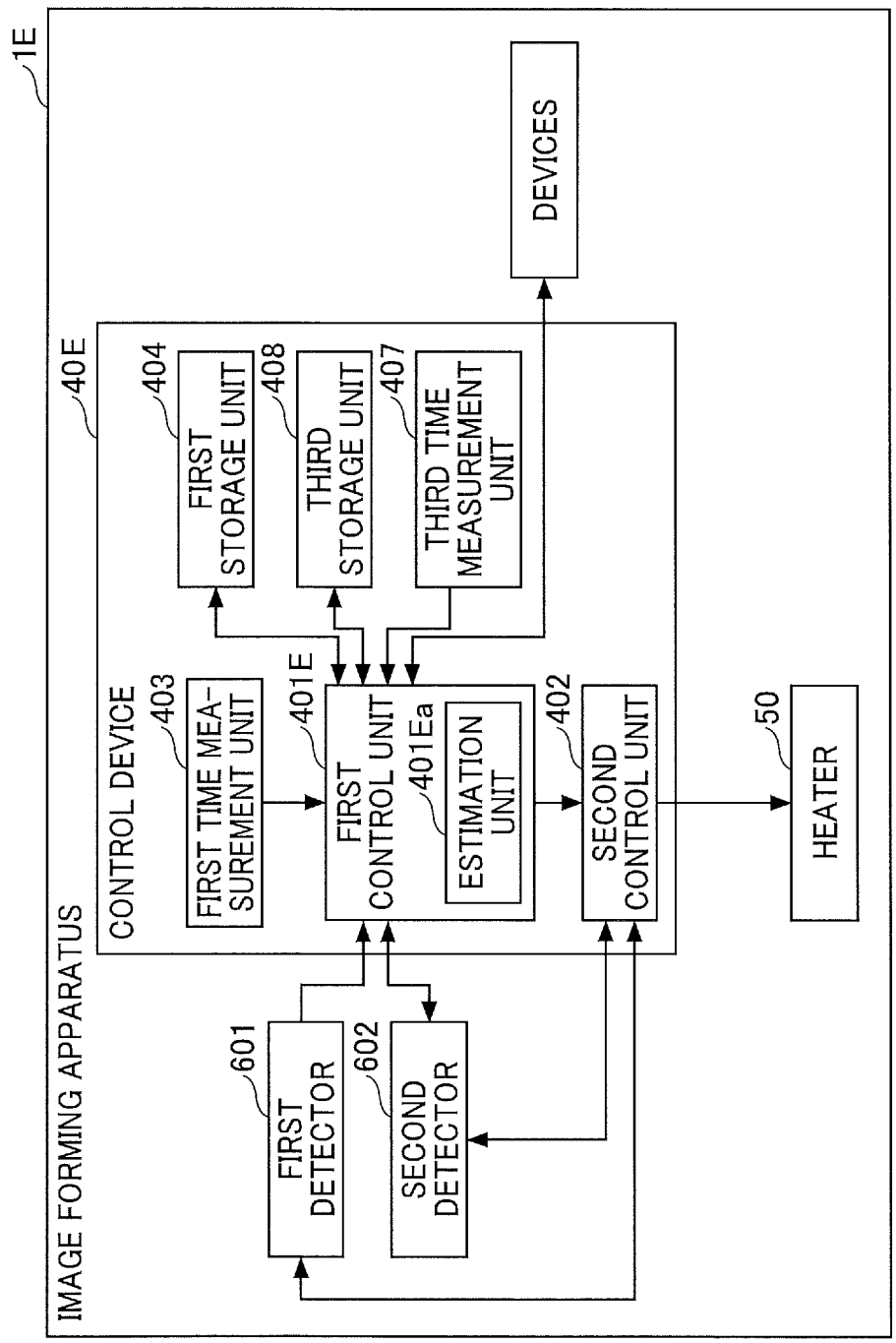
FIG. 15 is a block diagram illustrating an example of a functional configuration of a control device of an image forming apparatus according to a sixth embodiment.
Figure 16:
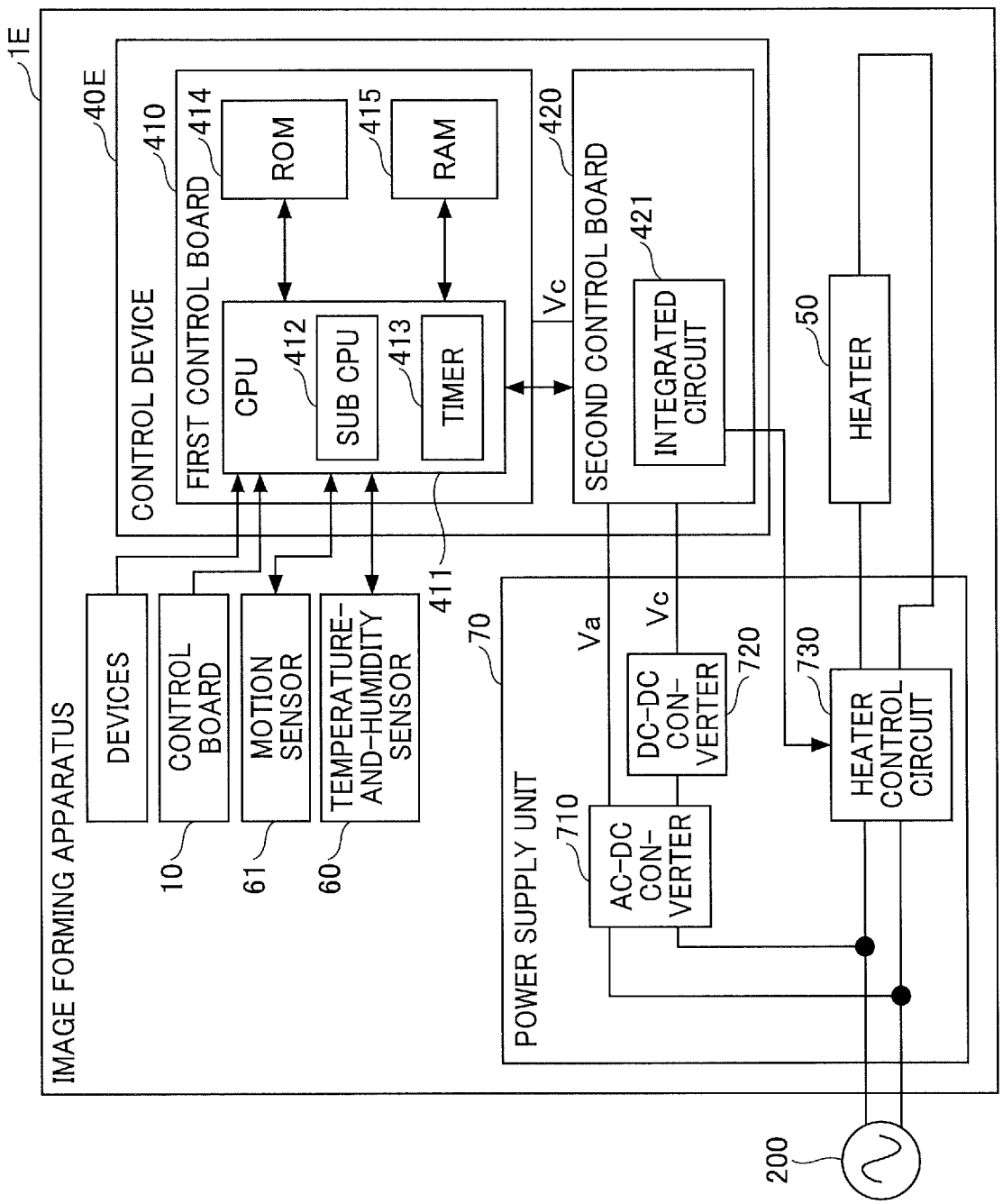
FIG. 16 is a block diagram illustrating an example of a hardware configuration of the control device of the image forming apparatus according to the sixth embodiment.

The image forming apparatus 1E according to the sixth embodiment will be described. FIG. 15 is a block diagram illustrating an example of a functional configuration of a control device 40E of an image forming apparatus 1E according to the sixth embodiment. FIG. 16 is a block diagram illustrating an example of a hardware configuration of the control device 40E of the image forming apparatus 1E according to the sixth embodiment.

As illustrated in FIG. 15, the functional configuration of the image forming apparatus 1E according to the sixth embodiment is similar to the functional configuration of the fifth embodiment except for the control device 40E and a second detector 602. The image forming apparatus 1E includes a second detector 602 that detects a person approaching the image forming apparatus 1E. The second detector 602 outputs the detection result to the control device 40E. Then, the control device 40E includes a first control unit 401E instead of the first control unit 401D with respect to the control device 40D according to the fifth embodiment. Furthermore, the first control unit 401E includes an estimation unit 401Ea.

As illustrated in FIG. 16, the hardware configuration of the image forming apparatus 1E according to the sixth embodiment is similar to the hardware configuration of the first embodiment except for a motion sensor 61. The motion sensor 61 is hardware that implements the second detector 602, and detects a person approaching the image forming apparatus 1E and outputs the detection result to the CPU 411. The motion sensor 61 senses a person in a predetermined area around the motion sensor 61 to detect the person approaching the image forming apparatus 1E. For example, the motion sensor 61 emits a sensing line around the motion sensor 61 and senses a person crossing the sensing line. Examples of the sensing line include an infrared light, a ultrasonic wave, a visible light, or a combination of the aforementioned examples.

Referring to FIG. 15, the first control unit 401E similarly functions to the first control unit 401D according to the fifth embodiment. Furthermore, the estimation unit 401Ea of the first control unit 401E estimates the number of persons detected in a time period on the basis of the time detected by the third time measurement unit 407 and the number of persons detected by the second detector 602.

That is, the estimation unit 401Ea estimates a temporal frequency of persons approaching the image forming apparatus 1E on the basis of the detection result of the person by the second detector 602 and the detection result of the time of the third time measurement unit 407. Specifically, the estimation unit 401Ea calculates the number of persons approaching the image forming apparatus 1E per seventh predetermined time as the above frequency, and causes the third storage unit 408 to store the calculated frequency in association with a detection time zone of the persons or a detection date of the persons. In the present embodiment, the seventh predetermined time is, but not limited to, one hour. For example, the seventh predetermined time may be one or more minutes, hours, days, weeks, months, periods, or the like. Here, the seventh predetermined time is an example of a time period.

Furthermore, the third storage unit 408 stores the frequency of persons approaching the image forming apparatus 1E in association with the periodic return cycle. The behavior of the above frequency can be regarded to be similar to the behavior of the use frequency of the image forming apparatus 1E. For this reason, the above frequency and the periodic return cycle can be associated by a rule similar to the use frequency and the periodic return cycle of the fifth embodiment.

Then, the first control unit 401E specifies the frequency corresponding to the time by referring to the third storage unit 408 on the basis of the time detected by the third time measurement unit 407, and determines the periodic return cycle according to the specified frequency, similarly to the first control unit 401D according to the fifth embodiment. According to the above-described image forming apparatus 1E of the sixth embodiment, effects similar to the effects of the image forming apparatus 1D according to the fifth embodiment can be obtained. Furthermore, the image forming apparatus 1E according to the sixth embodiment includes the third time measurement unit 407 that measures the time, the second detector 602 that detects a person approaching the image forming apparatus 1E, and the estimation unit 401Ea that estimates the number of persons detected in the time period on the basis of the time detected by the third time measurement unit 407 and the number of persons detected by the second detector 602. The first control unit 401E changes the cycle of periodic return from the deep sleep state to the sleep state according to the estimation result of the estimation unit 401Ea.

According to the above configuration, the image forming apparatus 1E changes the periodic return cycle according to the estimated number of persons detected in the time period. The behavior of the estimated number is similar to the behavior of the use frequency of the image forming apparatus 1E. For example, the image forming apparatus 1E can decrease power consumption by making the cycle long in a case where the estimated number is small. The image forming apparatus 1E can effectively operate the heater 50 for removing humidity by making the cycle short in a case where the estimated number is large, whereby improving print quality. For example, in a case where the image forming apparatus 1E is used in a business company, the estimated numbers in various time periods may be calculated and used according to business hours, close hours, a business day, or the like of the business company.

Other Embodiments

As described above, the examples of the embodiments of the present invention have been described. However, the present invention is not limited to the above embodiments. That is, various modifications and improvements are possible within the scope of the present invention. For example, embodiments in which various modifications are applied to the above embodiments, and embodiments constructed by combining the constituent elements in different embodiments are also included in the scope of the present invention.

Further, the present invention also includes an image forming method. For example, an image forming method includes putting an image forming apparatus into a standby state, a sleep state having smaller power consumption than the standby state, or a deep sleep state having smaller power consumption than the sleep state, causing, in the deep sleep state, the image forming apparatus to periodically and temporarily return to the sleep state, acquiring information of humidity of an inside of the image forming apparatus in the sleep state having returned from the deep sleep state, and outputting a command to heat the inside of the image forming apparatus according to the information of humidity. According to this image forming method, effects similar to the effects of the above-described image forming apparatus can be obtained. Such an image forming method may be implemented by a circuit such as a CPU or an LSI, an integrated circuit (IC) card, a single module, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus comprising:
a heater configured to heat an inside of the image forming apparatus;
first control circuitry configured to cause the image forming apparatus to be in a standby state, a sleep state having smaller power consumption than the standby state, or a deep sleep state having smaller power consumption than the sleep state, the standby state, the sleep state, and the deep sleep state being states in which the image forming apparatus does not operate for image formation;
second control circuitry configured to control an operation of the heater, and
a detector configured to detect humidity of the inside of the image forming apparatus,
wherein the first control circuitry causes the image forming apparatus in the deep sleep state to temporarily return to the sleep state at a predetermined interval, and the second control circuitry operates the heater according to the humidity detected by the detector in the sleep state to which the image forming apparatus has returned from the deep sleep state.

2. The image forming apparatus according to claim 1, further comprising a memory,
wherein the second control circuitry stores a number of times of operation of the heater in the memory, and
wherein the first control circuitry extends a cycle of periodic return from the deep sleep state to the sleep state in a case where the number of times is equal to or smaller than a threshold value, and shortens the cycle in a case where the number of times is larger than the threshold value.

3. The image forming apparatus according to claim 1, further comprising a memory,
wherein the second control circuitry stores an accumulated time of operation of the heater in the memory, and
wherein the first control circuitry extends a cycle of periodic return from the deep sleep state to the sleep state in a case where the accumulated time is equal to or shorter than a threshold value, and shortens the cycle in a case where the accumulated time is longer than the threshold value.

4. The image forming apparatus according to claim 1,
wherein the first control circuitry causes the image forming apparatus to return to the sleep state instead of a periodic return from the deep sleep state to the sleep state in response to acquisition of an operation input to the image forming apparatus in the deep sleep state.

5. The image forming apparatus according to claim 1, further comprising:
a timer configured to measure a time; and a memory configured to store busy and slack information that is temporal information of a use frequency of the image forming apparatus,
wherein the first control circuitry specifies the use frequency on basis of the time detected by the timer, and changes a cycle of periodic return from the deep sleep state to the sleep state according to the use frequency.

6. The image forming apparatus according to claim 1, further comprising:
a timer configured to measure a time; and
another detector configured to detect a person approaching the image forming apparatus,
wherein the first control circuitry estimates a number of persons detected during a time period on basis of the time detected by the timer and the person detected by said another detector,
wherein the first control circuitry changes a cycle of periodic return from the deep sleep state to the sleep state according to an estimation result of the number of persons during the time period.

7. The image forming apparatus according to claim 1, wherein the first control circuitry stops operation of the detector in the deep sleep state and causes the detector to operate in the sleep state to which the image forming apparatus has returned from the deep sleep state.

8. The image forming apparatus according to claim 1, wherein a period of the sleep state to which the image forming apparatus temporarily returns from the deep sleep state at the predetermined interval is shorter than a period of the deep sleep state between the sleep states.

9. An image forming method comprising:
putting an image forming apparatus into a standby state, a sleep state having smaller power consumption than the standby state, or a deep sleep state having smaller power consumption than the sleep state, the standby state, the sleep state, and the deep sleep state being states in which the image forming apparatus does not operate for image formation;
causing the image forming apparatus in the deep sleep state to temporarily return to the sleep state at a predetermined interval;
acquiring information of humidity of an inside of the image forming apparatus in the sleep state to which the image forming apparatus has returned from the deep sleep state; and
outputting a command to heat the inside of the image forming apparatus according to the information of humidity.

10. An image forming apparatus comprising:
a heater configured to heat an inside of the image forming apparatus;
first control means for causing the image forming apparatus to be in a standby state, a sleep state having smaller power consumption than the standby state, or a deep sleep state having smaller power consumption than the sleep state, the standby state, the sleep state, and the deep sleep state being states in which the image forming apparatus does not operate for image formation;
second control means for controlling an operation of the heater; and
detecting means for detecting humidity of the inside of the image forming apparatus,
wherein the first control means causes the image forming apparatus in the deep sleep state to temporarily return to the sleep state at a predetermined interval, and the second control means operates the heater according to the humidity detected by the detecting means in the sleep state to which the image forming apparatus has returned from the deep sleep state.

* * * * *